United States Patent
Espinasse et al.

(10) Patent No.: US 11,746,962 B2
(45) Date of Patent: Sep. 5, 2023

(54) MOVABLE DEVICE FOR INSPECTING A PRODUCTION LINE PARTIALLY SUBMERGED IN AN EXPANSE OF WATER, SUITABLE FOR NEGOTIATING A CURVE IN THE PRODUCTION LINE, AND ASSOCIATED INSTALLATION AND METHOD

(71) Applicant: TECHNIP FRANCE, Courbevoie (FR)

(72) Inventors: Philippe Espinasse, Bihorel (FR); Olivier Gageonnet, Maisons Laffitte (FR); Olivier Bernard, Rousset (FR); Cédric Lauzier, Marseilles (FR)

(73) Assignee: TECHNIP FRANCE

( * ) Notice: Subject to any disclaimer, the term of this patent is extended or adjusted under 35 U.S.C. 154(b) by 22 days.

(21) Appl. No.: 16/462,564

(22) PCT Filed: Nov. 21, 2017

(86) PCT No.: PCT/EP2017/079910
§ 371 (c)(1),
(2) Date: May 21, 2019

(87) PCT Pub. No.: WO2018/091734
PCT Pub. Date: May 24, 2018

(65) Prior Publication Data
US 2020/0056745 A1    Feb. 20, 2020

(30) Foreign Application Priority Data

Nov. 21, 2016 (FR) .................. 16 61288

(51) Int. Cl.
*F17D 5/02* (2006.01)
*F17D 5/00* (2006.01)
(Continued)

(52) U.S. Cl.
CPC ............... *F17D 5/02* (2013.01); *F17D 5/005* (2013.01); *G01N 27/902* (2013.01);
(Continued)

(58) Field of Classification Search
CPC .. F17D 5/02; F17D 5/005; F17D 5/00; G01N 27/902; G01N 29/55; G01N 29/265; G01N 2291/2634
See application file for complete search history.

(56) References Cited

U.S. PATENT DOCUMENTS

| | | | | |
|---|---|---|---|---|
| 3,646,807 A | * | 3/1972 | Gray ........................ | G01M 7/04 73/665 |
| 5,018,451 A | * | 5/1991 | Hapstack .................. | F17D 5/00 104/138.2 |
| 2016/0059939 A1 | * | 3/2016 | Lamonby ................ | E21B 41/00 114/337 |

FOREIGN PATENT DOCUMENTS

| | | | | |
|---|---|---|---|---|
| EP | 2 626 613 A1 | 8/2013 | | |
| EP | 2626613 A1 | * | 8/2013 | .............. F16L 55/34 |

(Continued)

OTHER PUBLICATIONS

Specification for Unbonded Flexible Pipe—American Petroleum Institute (API), API 17J, 3rd edition—Jul. 2008—Effective Date: Jan. 1, 2009; ISO 13628-2:2006.
(Continued)

*Primary Examiner* — Tarun Sinha
(74) *Attorney, Agent, or Firm* — OSTROLENK FABER LLP

(57) ABSTRACT

A device comprises an assembly for attaching to and moving on the production line. The attachment and movement assembly comprises at least two clamps that can be actuated selectively to clamp the production line, the attachment and movement assembly comprising an active mechanism for moving the clamps longitudinally relative to each other. The
(Continued)

attachment and movement assembly comprises a tilting mechanism for tilting the clamps relative to each other, between a position in which they are parallel to each other and a position in which they are tilted with respect to each other. The tilting mechanism comprises a flexion bar capable of switching from a straight configuration in the parallel position of the clamps to a curved configuration in the tilted position of the clamps.

14 Claims, 11 Drawing Sheets

(51) Int. Cl.
   *G01N 27/9013* (2021.01)
   *G01N 29/22* (2006.01)
   *G01N 29/265* (2006.01)

(52) U.S. Cl.
   CPC ......... *G01N 29/225* (2013.01); *G01N 29/265* (2013.01); *G01N 2291/2634* (2013.01)

(56) References Cited

FOREIGN PATENT DOCUMENTS

| FR | 3 031 186 | 7/2016 |
| FR | 3 031 186 A1 | 7/2016 |
| GB | 2536119 A | 9/2016 |
| WO | WO 2010/105003 A2 | 9/2010 |

OTHER PUBLICATIONS

Recommended Practice for Flexible Pipe—American Petroleum Institute (API), API RP 17B, 3$^{rd}$ edition—Mar. 2002.
Specification for Subsea Umbilicals—American Petroleum Institute (API), API 17E, 4$^{TH}$ edition—Oct. 2010—Effective Date: Apr. 1, 2011; ISO 13628-5:2009.
International Search Report dated Feb. 28, 2018 in corresponding PCT International Application No. PCT/EP2017/079910.
Written Opinion dated Feb. 28, 2018 in corresponding PCT International Application No. PCT/EP2017/079910.
Preliminary Search Report dated Aug. 11, 2017 in corresponding French Patent Application No. 1661288.

* cited by examiner

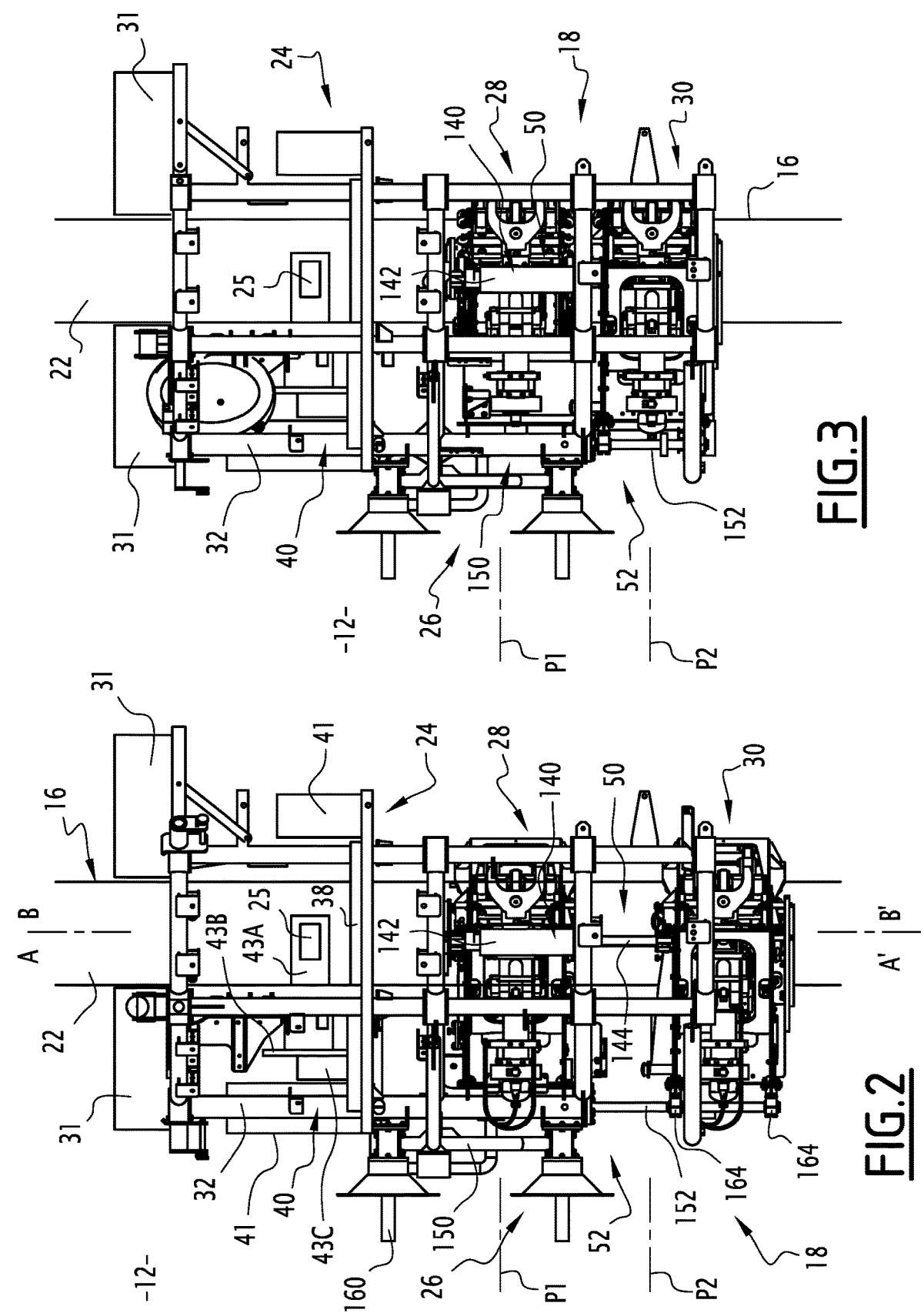

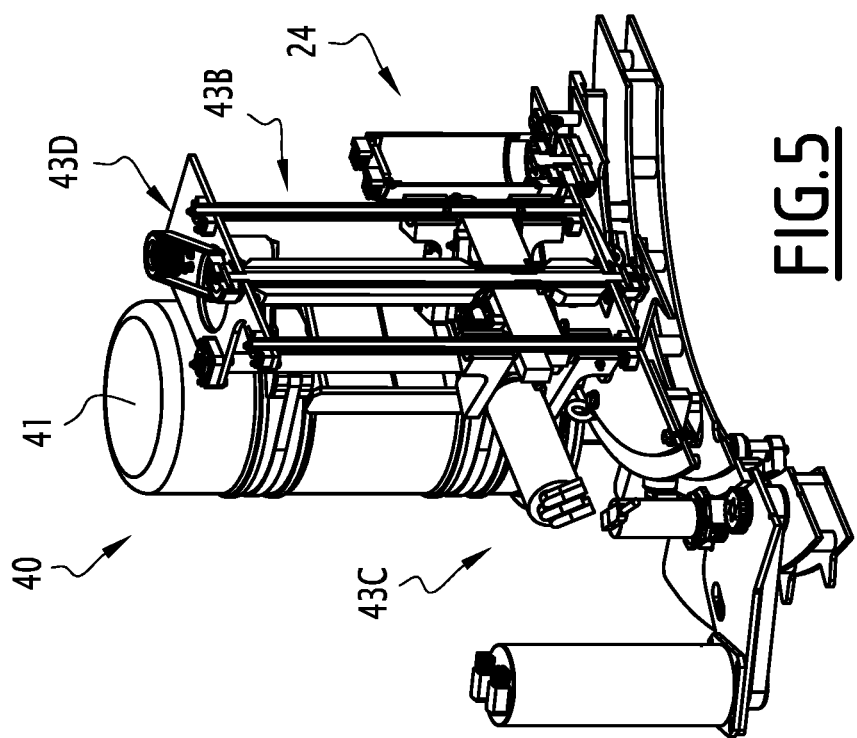
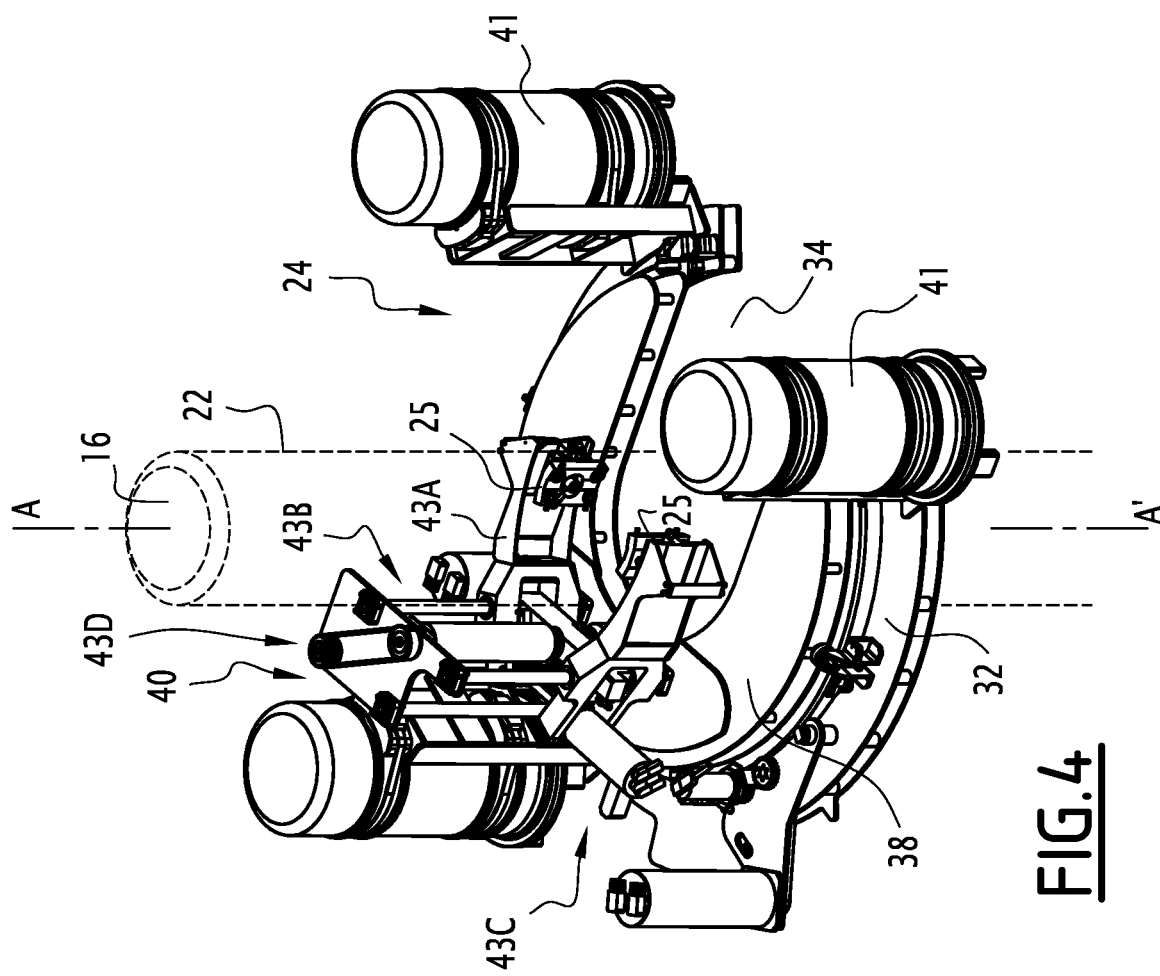

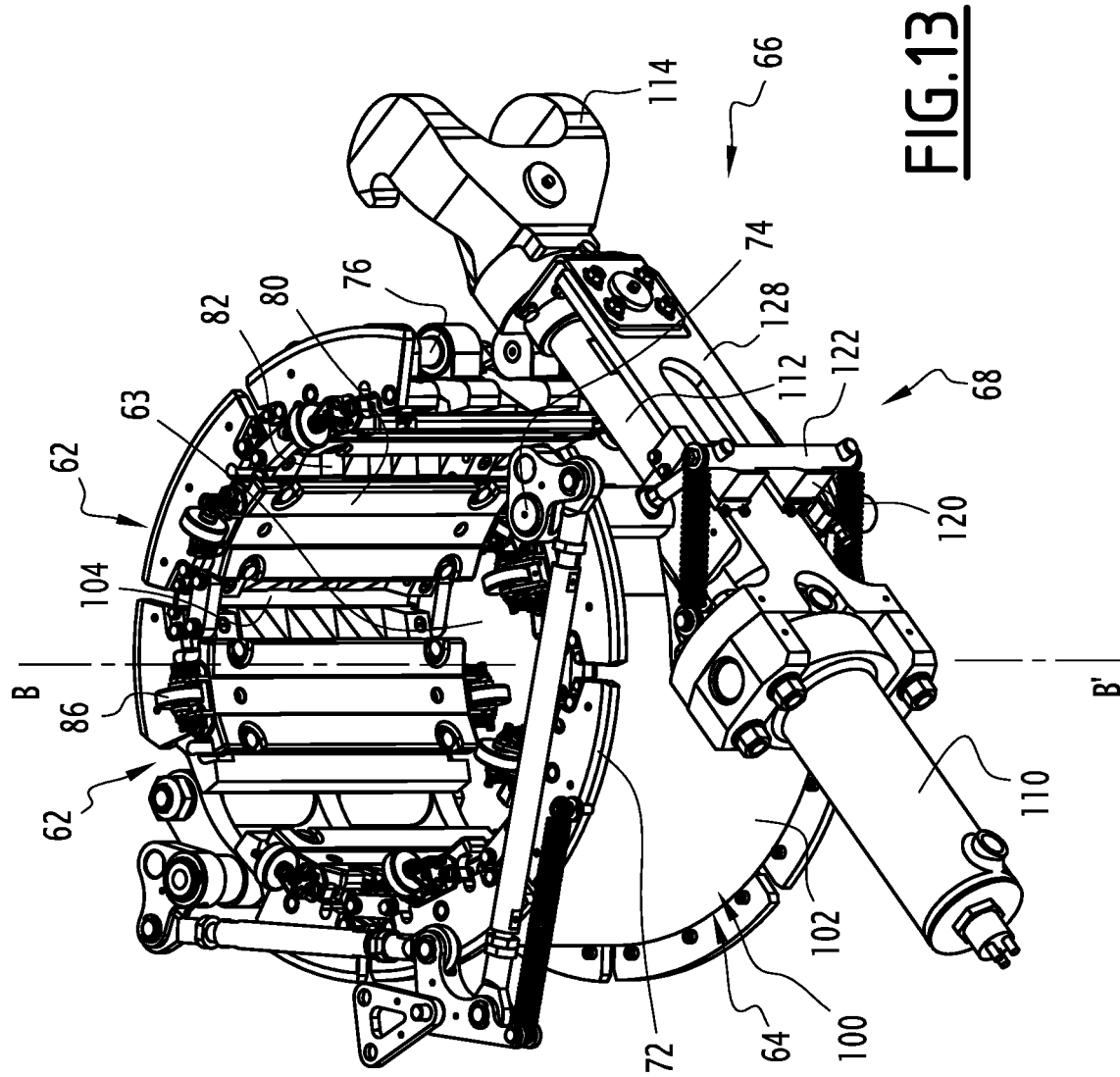

MOVABLE DEVICE FOR INSPECTING A PRODUCTION LINE PARTIALLY SUBMERGED IN AN EXPANSE OF WATER, SUITABLE FOR NEGOTIATING A CURVE IN THE PRODUCTION LINE, AND ASSOCIATED INSTALLATION AND METHOD

CROSS-REFERENCE TO RELATED APPLICATIONS

The present application is a 35 U.S.C. §§ 371 national phase conversion of PCT/EP2017/079910, filed Nov. 21, 2017, which claims priority to French Patent Application No. 16 61288, filed Nov. 21, 2016, the contents of which are incorporated herein by reference. The PCT International Application was published in the French language.

TECHNICAL FIELD

The present invention relates to a movable device for inspecting a production line intended to be partially submerged in a body of water, including:

an inspection support bearing at least one sensor capable of being positioned facing the production line;

an attaching and moving assembly for attaching to and moving on the production line, connected to the inspection support.

BACKGROUND OF THE INVENTION

Such a device is in particular intended to inspect a production line in a fluid exploitation installation, in particular for hydrocarbons.

The production line is for example a flexible pipe (in particular as described in the normative documents published by the American Petroleum Institute (API), API 17J, 3rd edition—Jan. 1st, 2009 and API RP 17B, 3rd edition—March 2002). Alternatively, the production line is an umbilical or a rigid pipe.

Such production lines are in particular used in deep waters in the oil and gas industry, and generally extend through a body of water between a surface installation and a bottom assembly. These production lines can also extend between two surface installations.

These production lines, and in particular the flexible pipes, are generally provided with armors that ensure their axial tensile holding. The armors are outwardly protected by an outer sheath made from a polymeric material that prevents the saltwater from the body of water from penetrating in contact with the armors. However, if the outer sheath is deteriorated and/or pierced, the armors may come into contact with saltwater, which can lead to accelerated corrosion.

Furthermore, in the case of flexible pipes, a polymeric pressure sheath arranged below the armors tightly delimits an inner circulation passage for the fluid. Nevertheless, certain acid compounds contained in the fluid may spread through the pressure sheath and penetrate the annular space between the pressure sheath and the outer sheath, in which the armors are found, also promoting corrosion.

The aforementioned pipes further undergo very high axial tensile forces, in particular when the body of water in which the pipe is positioned is very deep.

In this case, the upper part of the pipe near the surface assembly reacts a very significant axial tension, which may reach several hundreds of tons.

The axial tension not only has a high average value, but also permanent variations depending on the vertical movements of the surface assembly and the pipe, under the effect of the agitation of the body of water caused by the swell or by the waves.

The axial tension variations may reach several tens of tons and repeat continually throughout the lifetime of the pipe. In 20 years, the number of cycles may thus reach more than 100 million.

Over time, the armors are therefore subject to fatigue phenomena in particular resulting from corrosion and mechanical stresses applied on the pipe.

These phenomena, as well as other events, may in some cases lead to a deterioration of the properties of the pipe over time, in particular after several years of use.

To that end, to verify the integrity of the pipe, it is known to perform an on-site inspection of the pipe using a device moving on the pipe. This operation, limited in time, advantageously includes a visual inspection and optionally measures including an ultrasonic echography, a determination of the magnetic fluxes leaving the pipe, and/or a determination of the Foucault currents detected along the surface of the pipe.

This determination involves placing measuring sensors as close as possible to the outer surface of the pipe and moving them regularly.

At shallow depths, divers can perform this type of inspection.

For greater depths, a device of the aforementioned type intended to perform a video, ultrasound and x-ray inspection is for example described in WO2010/105003.

For its placement, the device is submerged at a depth of several tens of meters below the surface, then is attached on the production line by means of a remotely controlled robot. The device then moves on the production line, in the body of water, to perform a measuring campaign.

The device follows the curvature of the production line owing to a very reduced contact surface formed by two separated sets of wheels and a functional play between the wheels and the production line. The positioning precision between the device and the production line is sufficient for a video inspection as described in WO2010/105003.

Such a device is not, however, fully satisfactory for measurements requiring increased precision, in particular to perform integrity measurements of the production line.

SUMMARY OF THE INVENTION

One aim of the invention is therefore to provide an inspection device that allows a minute and very stable inspection of a production line partially submerged in a body of water, irrespective of the position of the device on the production line and irrespective of the curve of the production line.

To that end, the invention relates to a device of the aforementioned type, characterized in that the attaching and moving assembly includes at least two clamps that can be selectively actuated so that it grips onto the production line, each clamp delimiting a central passage of longitudinal axis, capable of receiving the production line, the clamps being longitudinally movable relative to one another along the production line, the attaching and moving assembly comprising an active mechanism for moving the clamps longitudinally relative to one another;

the attaching and moving assembly including a mechanism for tilting the clamps relative to one another, between a position parallel to one another and a position tilted relative to one another the tilting mechanism comprising a flexion bar able to go from a straight configuration, in the parallel position of the clamps to a curved configuration in the tilted position of the clamps.

The device according to the invention may include one or more of the following features, considered alone or according to any technically possible combination(s):

the flexion bar is biased elastically toward its straight configuration;

the curve radius of the flexion bar in the curved configuration is greater than 50 m;

the tilting mechanism comprises a jacket movable jointly with a first clamp from among the clamps, the flexion bar being movable jointly with a second clamp from among the clamps, the flexion bar being mounted translatable in the jacket, between a position inserted in the jacket and a position removed from the jacket;

the inspection support is movable jointly with the first clamp and with the jacket;

the jacket defines a housing for receiving the flexion bar, the flexion bar comprising a head for guiding the movement of the flexion bar in the jacket, with a cross-section complementary to the receiving housing of the jacket;

the flexion bar includes a rod, the jacket defining a housing for receiving the flexion bar, with a section larger than that of the rod, the jacket including a guide sleeve of the rod, with a cross-section complementary to that of the rod;

the active longitudinal movement mechanism of the clamps relative to one another includes at least one longitudinal jack mounted on a first clamp from among the clamps, the longitudinal jack including a rod deployable parallel to the flexion bar in the straight configuration, the rod being mounted on a second clamp from among the clamps;

the active longitudinal movement mechanism of the clamps relative to one another includes a first longitudinal jack mounted on the first side of the clamps, and a second longitudinal jack, mounted on a second side of the clamps, the clamps being received in the space with triangular cross-section defined between the flexion bar, the first longitudinal jack, and the second longitudinal jack;

the longitudinal jack comprises a cylinder articulated on the first clamp, the rod being articulated on the second clamp.

The invention also relates to a fluid exploitation installation in a body of water, including:

a production line deployed in the body of water, the production line having at least one curved region;

a device as defined above, attached to the production line by means of at least one clamp of the attaching and moving assembly, the device being movable on the flexible production line in the curved region, by passage of the flexion bar from its straight configuration to its curved configuration.

The installation according to the invention can comprise one or several of the following features, considered alone or according to any technically possible combinations: the production line is a flexible fluid transport pipe, a rigid fluid transport pipe, an umbilical or a cable.

The invention also relates to a method for inspecting a production line in a body of water, the production line having a curved region, the method comprising the following steps:

attaching a device as defined above, onto the production line by means of the attaching and moving assembly;

movement of the device along the production line by movement of the clamps of the attaching and moving assembly, inspecting the production line using the or each sensor;

the movement step comprising the passage from the curved region by rotation of the clamps relative to one another between their parallel position and their tilted position, the rotation of the clamps comprising the deformation of the flexion bar from the straight configuration to the curved configuration.

The method according to the invention may comprise one or more of the following features, considered alone or according to any technically possible combination: the movement step comprises the following phases:

attaching a second clamp relative to the production line;

releasing a first clamp onto the production line, the first clamp being mobile jointly with the inspection support;

moving the second clamp away from the first clamp to raise the first clamp and the inspection support jointly relative to the production line;

attaching the first clamp onto the production line;

releasing the second clamp relative to the production line;

moving the second clamp toward the first clamp, the first clamp and the inspection support remaining immobile relative to the production line;

the inspection step comprises the radial movement of the sensor on the inspection support between a retracted idle position and a position deployed applied on the production line.

BRIEF DESCRIPTION OF THE DRAWINGS

The invention will be better understood upon reading the following description, provided solely as an example, and in reference to the appended drawings, in which:

FIGS. 2 and 3 are side views of the device of FIG. 1, the clamps of the device respectively being separated and brought closer to one another;

FIG. 4 is a top view of the inspection support comprising a plurality of sensors capable of being positioned facing the production line;

FIG. 5 is a view of a detail of FIG. 4;

FIGS. 13 and 14 are views similar to FIG. 11 and FIG. 12;

DESCRIPTION OF PREFERRED EMBODIMENTS

Figure 1:
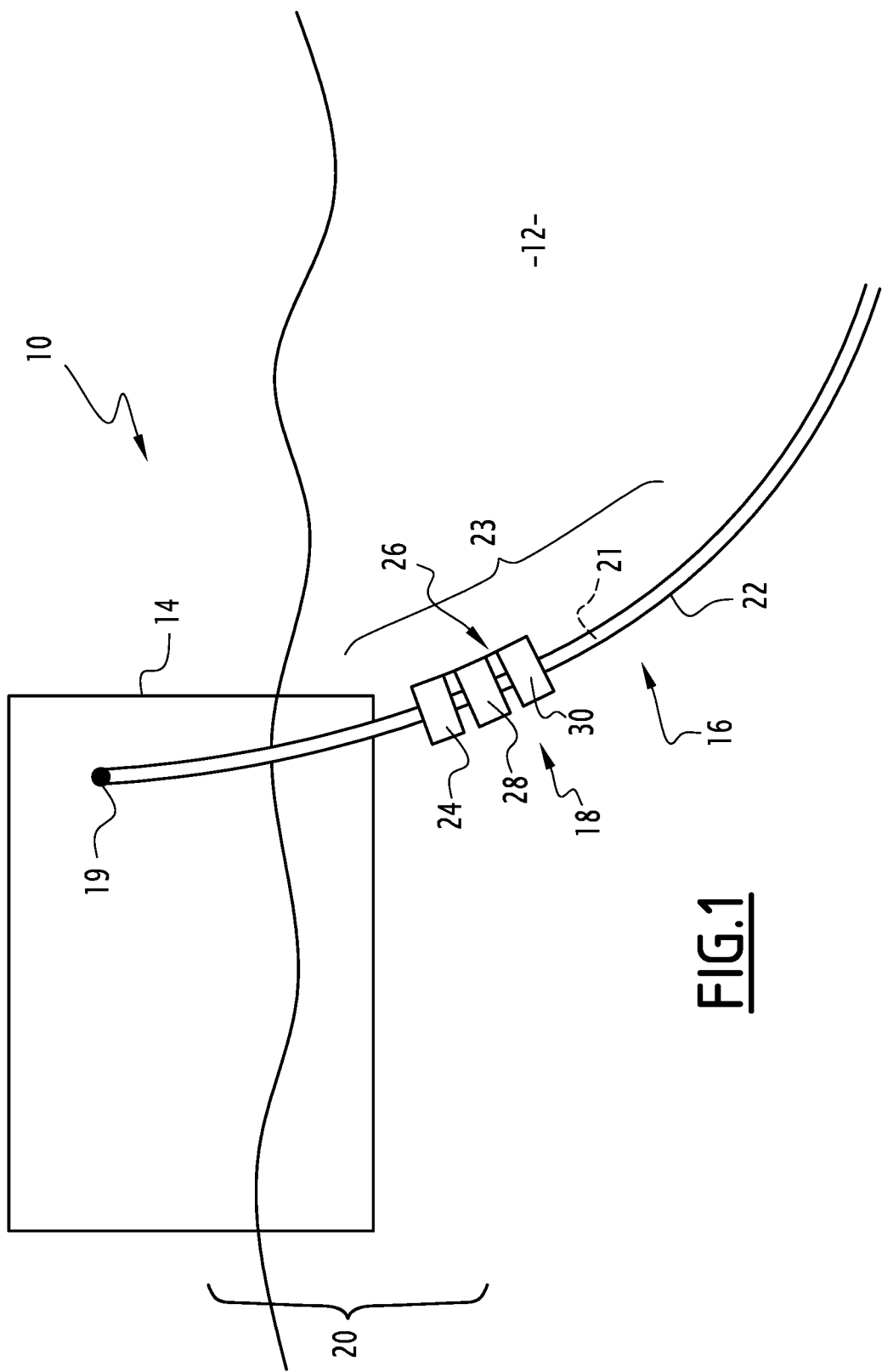
FIG. 1 is a schematic view of the upper part of the first fluid exploitation installation including a flexible production line and a mobile inspection device according to the invention, arranged in a splash zone.

A first fluid exploitation installation 10 in a body of water 12 is partially illustrated in FIG. 1.

The body of water 12 is for example a lake, sea or ocean. The depth of the body of water 12 at the installation 10 is for example between 50 m and 3000 m, or even 4000 m.

The installation 10 includes a surface assembly 14 and a bottom assembly (not shown) or two surface assemblies 14, and at least one production line 16 partially submerged in the body of water 12 from the surface assembly 14.

"Production line" refers to a line installed between the surface assembly 14 and the bottom assembly and capable of conveying a fluid, and a distinction should be made with a construction line not yet installed. Indeed, there is a major difference between these two types of lines, a deterioration of the production line being able to cause significant human, material and ecological disasters. Indeed, the production fluid, namely crude oil and/or raw gas, generally circulating in the production line is flammable and pressurized. Damage to the pipe can cause a fire or an explosion as well as contamination of the surrounding environment. In contrast, if damage occurs on a construction line, for example during installation, it is still possible to change it without harm occurring other than economic harm. The catching conditions of a device onto a production line are therefore much more critical than onto a construction line.

The installation 10 further comprises, according to the invention, a mobile inspection device 18 intended to catch reversibly and to travel on the production line 16 to inspect said production line 16.

The surface assembly 14 is for example floating. It is advantageously formed by a surface naval support that may for example be a Floating Production, Storage and Offloading (FPSO) unit, or a Floating Liquefied Natural Gas (FLNG) unit, a semisubmersible platform, which may for example be a Tension Leg Platform (TLP), an unloading buoy, a floating vertical column or a ship. In a variant, the surface assembly 14 is a fixed rigid structure of the "jacket" type or an oscillating structure subject to the seabed.

In this example, the production line 16 connects the bottom assembly to an upper point 19 on the surface assembly 14. The production line 16 is therefore partially submerged in the body of water 12 and has an upper segment arranged in a volume of air, while passing through a splash zone 20. This splash zone 20 for example extends up to a depth of about 5 m with favorable sea conditions. Currents generated by the mass transport caused by the swell are next present beyond the splash zone up to a depth of about 50 m.

The production line 16 is then a riser.

One variant consists of a production line 16 partially submerged in the body of water 12 and for example connecting two surface assemblies 14 (typically an unloading buoy and a FPSO). This is in particular the case for production lines of the OOL ("Oil Offloading Line") type.

The production line 16 here is a flexible line. In the example shown in FIG. 1, the production line 16 is a flexible pipe intended to transport a fluid, in particular hydrocarbons. It thus delimits a central aperture 21 for the flow of a fluid. Such a pipe is for example described in normative documents API 17J and API 17B published by the American Petroleum Institute (API), API 17J (3rd edition—Jan. 1, 2009) and API RP 17B (3rd edition—March 2002). It includes an inner sheath confining the fluid in the central aperture, at least one tensile armor layer, and an outer sheath on which the mobile inspection device 18 catches and travels.

In a variant, as specified above, the production line 16 here is an umbilical. An umbilical is a production line as defined in the normative documents published by the American Petroleum Institute (API), API $17^E$ ($4^{th}$ edition—April 2011). The umbilical comprises an outer sheath containing at least one functional link such as a power cable, an optical fiber cable and/or a hydraulic line or bundles of functional links maintained in a sheath.

Also in a variant, the production line 16 is a rigid pipe. It then comprises at least one metal tube delimiting a central aperture 21. The metal tube is formed in one piece or is formed by an assembly of tubes segments welded end to end.

In another variant, the production line 16 is a bundle of rigid risers, connected to one another by spacers to prevent them from colliding in their lateral movements in the water.

The production line 16 defines an outer surface 22 onto which the mobile inspection device 18 catches and travels. It optionally includes at least one curved region 23 intended to be inspected by the mobile inspection device 18.

In reference to FIGS. 2 to 4, the mobile inspection device 18 includes an inspection support 24 bearing sensors 25, in particular visible in FIGS. 3 and 4, and an assembly 26 for catching onto and traveling along the production line 16, including two catching clamps 28, 30. The mobile inspection device 18 further includes at least one float 31 shown schematically in FIG. 3.

The inspection support 24 includes a frame 32 defining a U-shaped opening 34, a rotary plate 38, bearing the plurality of sensors 25, and a travel mechanism 40 of each sensor 25 toward the production line 16. It advantageously includes tight boxes 41 for receiving control electronics of the sensors 25.

The frame 32 is intended to extend perpendicular to the local axis of the production line 16 around a central part of the opening 34, with axis A-A', capable of receiving the production line 16. The opening 34 emerges laterally outward over the entire height of the frame 32, to allow the placement and removal of the inspection support 24 around the production line 16.

The frame 32 is made from metal. It has a bulk that can vary from 700 mm to 1500 mm in width and depth and between 1000 mm and 2000 mm in height.

The rotary plate 38 is mounted rotating about the axis A-A'. It is capable of rotating the sensors 25 about the local axis of the production line 16 to orient them angularly relative to the production line 16.

The travel mechanism 40 here comprises arms 43A for pressing the sensors 25 against the outer surface 22, a guide 43B for longitudinal travel of the pressing arms 43A along the production line 16, and an actuating device 43C, capable of moving the pressing arms 43A radially toward the axis A-A'.

The travel mechanism 40 also comprises an actuating device 43D capable of moving the pressing arms 43A along the longitudinal movement guide 43B and parallel to the axis A-A'.

The sensors 25 are nondestructive sensors. They for example include an ultrasound sensor, magnetic field detector (magnetometers), an x-ray tomography sensor, a guided wave sensor, a flat panel detector and/or a Foucault current detector.

The ultrasound sensor is intended to perform an echographic inspection of the type described in patent application FR 3,031,186. It applies on the outer surface 22 of the production line 16. The signal emitted by the sensor is transmitted in the production line 16 through the outer wall and the analysis of the reflected signal in particular makes it possible to determine information on the thickness of the outer wall, or even on the content located inside the outer wall.

The magnetic field detector is capable of performing a magnetic flux leakage (MFL) analysis. The detector includes an electromagnet capable of generating a magnetic field so as to magnetize the component to be tested. In the presence of surface flaws resulting in particular from corrosion, erosion or cracking phenomena, the magnetic flux leaks and is detected by the detector. This detector can in particular be a magnetic field sensor of the Hall effect sensor type. Such a method essentially applies to ferromagnetic materials.

The x-ray detector makes it possible to record the radiation transmitted after passing through an object. The data acquired during the measurement acquisition can be collected along multiple orientations. Using these measurement acquisitions, a digital image can be calculated and reconstructed mathematically, according to the principle of x-ray tomography. This technique makes it possible to access the core of the material to assess the radiological absorption variations and composition differences thereof. It also allows a very fine location of any heterogeneity, singularity present in an object, and verification of the assembly and positioning of complex mechanical assemblies.

The flat panel detector includes an x-ray source configured to emit X-photons intended to interact with the inspected production line 16. This x-ray source is advantageously a high-energy source, preferably greater than 2 MeV. The flat panel detector also includes an X-photon receiver configured to collect the X-photons emitted by the source after interaction with the production line 16 to be inspected. The flat panel detector is preferably a flat panel.

The guided wave sensor is capable of inspecting the mechanical integrity of different component elements of the inspected production line 16 remotely, up to several tens of meters away, in hard-to-reach or even inaccessible zones.

The Foucault current detector ("eddy current testing" or ECT) is capable of measuring the absolute or relative impedance of a detector that comprises a conductive coil in which an alternating current circulates. This method makes it possible to detect surface flaws and flaws near the surface, when the location and orientation of likely flaws is known beforehand.

Given the very small sensitivity surface (generally around several $mm^2$) of ultrasound, flux leakage and Foucault current sensors, the comprehensive inspection of the surface 22 requires sweeping the entire surface 22 of the production line 16 to be examined. The number of sensors intended to measure the same physical property is therefore generally greater than or equal to 2.

A high sweeping speed can be implemented to obtain an industrially satisfactory examining speed.

The sweeping of the entire surface of the production line 16 is done by the rotary plate 38 and the actuating devices 43C and 43D. The sweeping speed can reach 150 mm/s on each of the two axes.

The pieces of equipment of the inspection support 24 are tight, independently of one another. In particular, the inspection support 24 comprises a jack 43C and two brushless motors for the rotary plate 38 and the vertical travel system 43D of the sensors 25. The control/command systems of these motors are contained in a tight box.

In one embodiment, the following masses can be obtained:
 mass of a box: 40 kg, the inspection device 18 being able to comprise several,
 mass of the translation module: 75 kg
 mass of the rotary plate 38: 86 kg and 46 kg stationary plate guide
 mass of the motor means of the rotary plate 38: 26 kg
 mass of the frame 32: 430 kg.

Each sensor 25 is moved radially toward the axis A-A' by means of the travel mechanism 40 between a retracted idle position and a position deployed radially toward the production line 16, advantageously in contact with the production line 16. Each sensor 25 is further movable along the axis A-A'.

Each float 31 is for example formed from foam, in particular PVC foam, or a metal reservoir, in particular made from steel.

In one example, the total volume of the floats 31 is greater than 1000 liters, for example 1600 liters, to provide a maximum mass of 50 kg in the body of water 12. This facilitates the connection with a remotely operated vehicle (ROV). This mass is about 300 kg in a volume of air when the device is intended to be operated up to depths of 2000 m and is about 600 kg when the device is intended to be operated up to depths of 4000 m.

The mobile inspection device 18 can also include one or several cleaning modules (not shown) for the production line 16 before inspection. Indeed, over time, grime can become deposited on the production line 16, for example algae, mollusks or the like generally grouped together under the term marine incrustation. The cleaning module(s) can in particular include one or several nozzles coupled to one or several pumps to spray, against the production line 16, one or several high-pressure jets, for example of freshwater, but potentially seawater directly suctioned on site.

The cleaning module(s) may alternatively or in combination include one or several nozzles coupled to one or several marine pumps to spray, on the surface of the production line 16, one or several cavitation jets for example of freshwater, but preferably of seawater.

The cleaning module(s) may also or alternatively include rotary brushes intended to brush the production line 16.

One or several cleaning modules can be arranged upstream and/or downstream from the inspection support 24.

The cleaning module(s) can include one or several deflectors arranged upstream and/or downstream from the inspection support 24, said deflector(s) being configured to move the grime loosened from the production line 16 away from the sensors 25 in order to avoid any interference in the measurement acquisition.

In general, the total mass of the mobile inspection device 18 varies depending on whether the device bears one or several sensors 25 and one or several cleaning modules. The total mass of the mobile inspection device 18 is in practice less than 3000 kg, preferably less than 2000 kg.

In the example shown in FIGS. 2 and 3, the catching and travel assembly 26 includes a first upper clamp 28, mounted stationary relative to the inspection support 24, a second lower clamp 30, mounted mobile relative to the first clamp 28, and a mechanism 50 for longitudinal travel of the clamps 28, 30 relative to one another. According to the invention, the catching and travel assembly 26 further includes a mechanism 52 for tilting the clamps 28, 30 relative to one another.

Each clamp 28, 30 is capable of selectively gripping the production line 16. According to the invention, each clamp 28, 30 gripping the production line 16 is capable of individually bearing the mobile inspection device 18 so that it moves simultaneously in the body of water 12, on the surface of the body of water 12 in the splash zone 20, and outside the body of water 12, by reacting the weight of the mobile inspection device 18.

To that end, each clamp 28, 30 is capable of applying a clamping pressure on the production line 16. Clamping pressure refers to the average of the local pressures applied by the clamp 28, 30 on the contact surface between said clamp and the production line 16.

As a simplification measure, a nominal clamping pressure is preferably calculated. Nominal clamping pressure refers to the average of the local pressures applied by the clamp 28, 30 on a global surface Sm corresponding to the outer perimeter of the production line 16 multiplied by the contact length of the clamp 28, 30 with the production line 16.

This contact length will in particular be described more precisely in the remainder of the description.

Thus, each clamp 28, 30 is capable of applying a nominal clamping pressure generally of between 2 bar and 90 bar, and advantageously of between 2 bar and 40 bar. Preferably, and in order for the mobile inspection device 18 to be able to adapt and move over a large number of different production lines 16, in particular to adapt and move over flexible pipes, while respecting the most conservative standards, each clamp 28, 30 is able to apply a nominal clamping pressure of between 10 bar and 40 bar.

The nominal clamping pressure applied on the production line 16 by each clamp 28, 30 is preferably less than 80 bar in order to limit the risks of damage of the production line 16.

In practice, the clamping pressure can be measured using a matrix pressure sensor. The matrix pressure sensor can for example be capacitive. The matrix pressure sensor generally assumes the form of a flexible film including an array of pressure sensors forming a mesh of said flexible film and capable of providing information on the pressure applied at each point of the mesh. The matrix pressure sensor is arranged over the entire perimeter of the production line 16, or a cylindrical template with the same diameter as said production line, between said production line, or said template, and a clamp 28, 30. The clamp 28, 30 is next actuated so as to grip the production line 16, or the template, and thus apply a pressure on the matrix pressure sensor. The matrix pressure sensor then measures, at each point of the mesh, the pressure applied by the clamp 28, 30. The clamp 28, 30 is next loosened from the production line 16, or the template, so as to release the matrix pressure sensor. It is next possible via software processing to average all of the pressures measured on the overall surface so as to determine the nominal clamping pressure, etc.

The clamping force applied by each clamp 28, 30 is generally between 20 kN and 1000 kN, preferably between 40 kN and 700 kN. In practice, the clamping force applied by each clamp 28, 30 is advantageously between 50 kN and 200 kN to allow the inspection of the rigid pipes and umbilicals and advantageously between 130 kN and 700 kN to allow the inspection of both the flexible pipes and rigid pipes and umbilicals.

The clamping force can be measured by the matrix pressure sensor previously described, using software processing making it possible to incorporate the set of contact pressures measured on the measured contact surface.

Such a nominal clamping pressure makes it possible to react the weight of the mobile inspection device 18 as it evolves in a volume of air, the passage of the interface between the air and the water on the surface of the body of water 12, while being subject to the movements of the body of water 12, and the travel in the body of water 12.

The nominal clamping pressure applied by each clamp 28, 30 is chosen to correspond to the reacting of the weight of the mobile inspection device 18 and hydrodynamic forces applied on said mobile inspection device as well as to satisfy all of the issues previously mentioned and in particular in play when the mobile inspection device 18 leaves the body of water 12 and is located in the splash zone. It is generally constant, irrespective of the position of the mobile inspection device 18, either in the body of water 12, or at the interface between the body of water 12 in the air located above the body of water 12, or completely in the air above the body of water 12.

The weight of the mobile inspection device 18 can be completely or partially offset by the floats 31 in the body of water 12. The nominal clamping pressure is then superabundant. It is also superabundant when the mobile inspection device 18 is located entirely in the air, but to a lesser extent than when the device is located entirely in the body of water 12.

In another embodiment, the nominal clamping pressure is advantageously adapted to the position of the mobile inspection device 18 on the production line 16 and adjusted to be equal to the pressure necessary to maintain the mobile inspection device 18 on the production line 16 in this said position.

The aforementioned clamping pressure preferably applies over an area greater than 200 cm$^2$, advantageously greater than 2000 cm$^2$ and preferably between 1500 cm$^2$ and 8000 cm$^2$ over the outer surface 22 of the production line 16. This area then corresponds to the contact surface between the clamp 28, 30 and the aforementioned production line 16.

The actual contact surface between the clamp 28, 30 and the production line 16 can be measured using a developer film of the Fujifilm Prescale, Extreme Low Pressure, 4LW R310 3M 1-E type, which becomes colored under the effect of a pressure greater than 0.5 bar. The developer film is arranged over the entire perimeter of the production line 16, or a cylindrical template with the same diameter as said production line, between said production line, or said template, and a clamp 28, 30. The clamp 28, 30 is next actuated so as to grip the production line 16, or the template, and thus apply a pressure on the developer film. The surface of the developer film thus becomes colored at each point where the pressure applied by the clamp 28, 30 is greater than 0.5 bar. The clamp 28, 30 is next loosened from the production line 16, or the template, so as to release the developer film. It is then possible to measure the colored surface of the developer film using different measuring means, for example, an infrared area measuring device, an image acquisition device of the scanner type coupled to computer processing software for the image, etc.

This value is a reasonable approximation of the actual contact surface between the clamp 28, 30 and the production line 16, and in any case a low value of said actual contact surface.

Another solution to measure the actual contact surface consists of using a matrix pressure sensor identically to what was previously described, only the software processing varying and consisting of interpolating the actual contact surface rather than the nominal clamping pressure.

The clamping pressure is advantageously distributed around the production line 16, and advantageously applies over 30% or more of the periphery of the production line 16, preferably over 70% or more of the periphery of the production line 16. This limits the risks of deformation of the section of the production line 16. The ratio between the perimetric contact length of each clamp 28, 30 on the production line 16 and the perimeter of the clamp 28, 30 at the contact with the production line 16 is advantageously at least equal to 0.3, preferably at least equal to 0.7.

Each clamp 28, 30 thus defines a contact surface with the production line 16 with a length advantageously of between 150 mm and 600 mm, preferably between 300 mm and 500 mm, taken along the local axis of the production line 16 in the clamp 28, 30. This length is more generally less than 0.8 times the outer diameter of the production line 16.

The axial component of the vertical clamping force opposing the weight of the mobile inspection device 18 is generally between 20 kN and 80 kN, preferably between 20 kN and 50 kN.

Advantageously, the Applicant has developed a model for calculating the minimum axial component to be reacted in particular involving:
- the weight of the mobile inspection device 18 in the air;
- the following hydrodynamic forces:
  - the Buoyancy Force, which depends on the submerged volume of the mobile inspection device 18;
  - the inertia force during the movement of the mobile inspection device 18;
  - the wave damping forces;
  - the drag force of the mobile inspection device 18 in the water;
  - the wave excitation forces;
  - the slamming forces (in particular of the waves crashing on the mobile inspection device 18);
  - the water exit force;
  - the forces exerted by the production line 16 on the mobile inspection device 18 related to the movement of the production line 16 connected to the fluid exploitation installation 10, the latter being subject to hydrodynamic forces connected to the swell.
- safety coefficients.

It emerges from the model, in light of the orders of magnitude of weight and volume of the mobile inspection device 18, as well as sea conditions for which the mobile inspection device 18 is intended to operate (swell height Hs less than or equal to 3 m), that the minimum axial component to be reacted is equal to the product of a reaction coefficient $\beta$ of the hydrodynamic forces resulting from the hydrodynamic model multiplied by the weight of the mobile inspection device 18. In an adequate approximation, the coefficient $\beta$ is generally between 1.7 and 2.7 depending on the desired sea conditions and a more or less severe choice of the safety coefficients. Optimally, the coefficient $\beta$ is advantageously between 2 and 2.4, preferably equal to 2.25.

Thus, the radial clamping force is advantageously calculated using the formula:

$$(\beta \times Fc)/f$$

The clamping pressure is advantageously calculated using the formula:

$$(\beta \times Fc)/(f \times Sc) = (\beta \times Fc)/(f \times 2 \times \pi \times a \times Rc \times Lc)$$

where $\beta$ is the coefficient for reacting hydrodynamic forces resulting from the hydrodynamic model, Fc is the axial load, taken to be equal to the weight in the air of the mobile inspection device 18, f is the significant friction coefficient, Sc is the contact surface between the clamp 28, 30 and the production line 16. To calculate the surface Sc, a is the ratio between the perimetric contact length of each clamp 28, 30 on the production line 16 and the perimeter of the clamp 28, 30 at the contact with the production line 16, Rc is the outer radius of the production line 16, and Lc is the length of the clamp 28, 30, taken along the local axis of the production line 16.

Identically, the nominal clamping pressure is advantageously calculated using the formula:

$$(\beta \times Fc)/(f \times Sm) = (\beta \times Fc)/(f \times 2 \times \pi \times Rc \times Lc)$$

Where Sm is the global surface.

The value of a is advantageously at least equal to 0.3, preferably at least equal to 0.7 for the clamps 28, 30 according to the invention.

The significant friction coefficient f is calculated as follows. For the flexible pipes, the coefficient f is generally taken to be equal to the friction coefficient between the outer sheath and the armors, which is generally lower than the friction coefficient between the surface of the clamp 28, 30 and the outer sheath. The smaller of the two coefficients is generally chosen. The value of f is generally chosen between 0.05 and 0.5, for the flexible pipes preferably 0.07, advantageously 0.3.

For the rigid pipes and the umbilicals, the coefficient f is generally taken to be equal to the friction coefficient between the surface of the clamp 28, 30 and the outer surface 22 of the production line 16. It is chosen between 0.2 and 0.9 for the rigid pipes and the umbilicals, advantageously chosen to be equal to 0.3.

Examples of minimum nominal clamping pressure and clamping forces for flexible pipes, with a contact surface length of the clamp 28, 30 with the production line 16 of 400 mm, are given in the table below:

| Friction coefficient | 0.07 | 0.3 |
|---|---|---|
| Clamping force (kN) | 631 | 147 |
| Diameter of the production line 16 (m) | Nominal clamping pressure (bar) | |
| 0.46 (18") | 11.0 | 2.6 |
| 0.35 (14") | 14.1 | 3.3 |
| 0.25 (10") | 19.8 | 4.6 |
| 0.15 (6") | 32.9 | 7.7 |

Examples of minimum nominal clamping pressure and clamping forces for rigid pipes or umbilicals, with a contact surface length of the clamp 28, 30 with the production line 16 of 400 mm, are given in the table below:

| Clamp 28, 30 material | Steel | Aluminum | Steel | Steel |
|---|---|---|---|---|
| Outer surface material production line 16 | Steel | Steel | Polyethylene | Polyethylene |
| Friction coefficient | 0.25 | 0.45 | 0.3 | 0.8 |
| Clamping force (kN) | 177 | 98 | 147 | 55 |
| Diameter of the production line 16 (m) | Nominal clamping pressure (bar) | | | |
| 0.46 (18") | 3.1 | 1.7 | 2.6 | 1.0 |
| 0.35 (14") | 4.0 | 2.2 | 3.3 | 1.2 |

| | | | | |
|---|---|---|---|---|
| 0.25 (10") | 5.5 | 3.1 | 4.6 | 1.7 |
| 0.15 (6") | 9.2 | 5.1 | 7.7 | 2.9 |

Figure 11:
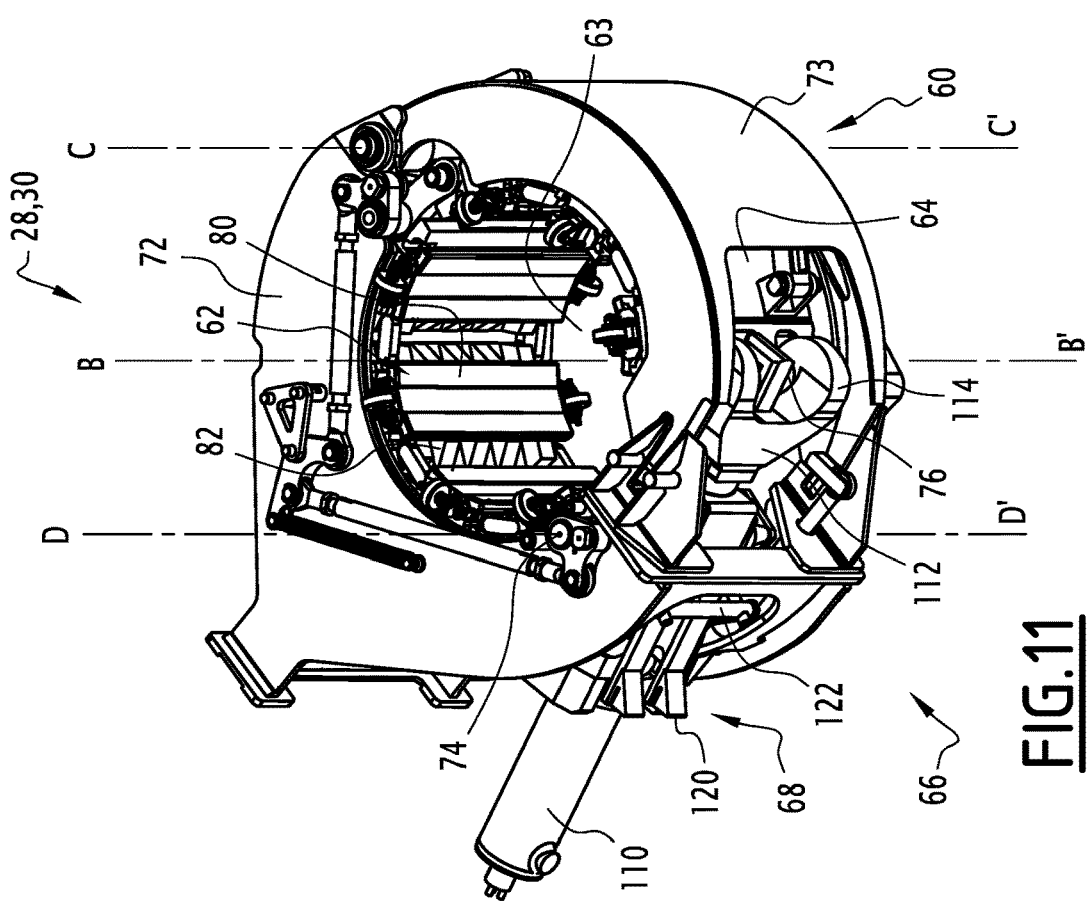
FIG. 11 is a three-quarters front perspective view of a clamp of the device of FIG. 1, the clamp being closed.

In the example shown in FIG. 11, each clamp 28, 30 includes a frame 60, and a mechanism for opening the frame 60 (not shown).

Each clamp 28, 30 further comprises a plurality of contact pads 62 with the production line 16, defining a central passage 63 for insertion of the production line 16, with axis B-B', a belt 64 for clamping the pads 62, a clamping actuator 66, capable of tightening the belt 64 and, according to the invention, a mechanism 68 for radial separating of the clamping actuator 66.

The frame 60 includes two rigid frame segments 72, 73, articulated relative to one another around an axis C-C' parallel to the axis B-B' of the passage 63. The frame segments 72, 73 are each in the shape of a C.

The frame 60 defines, on a first frame segment 72, a first articulation point 74 of the actuator 66 around an axis D-D' parallel to the axis B-B'.

Figure 12:
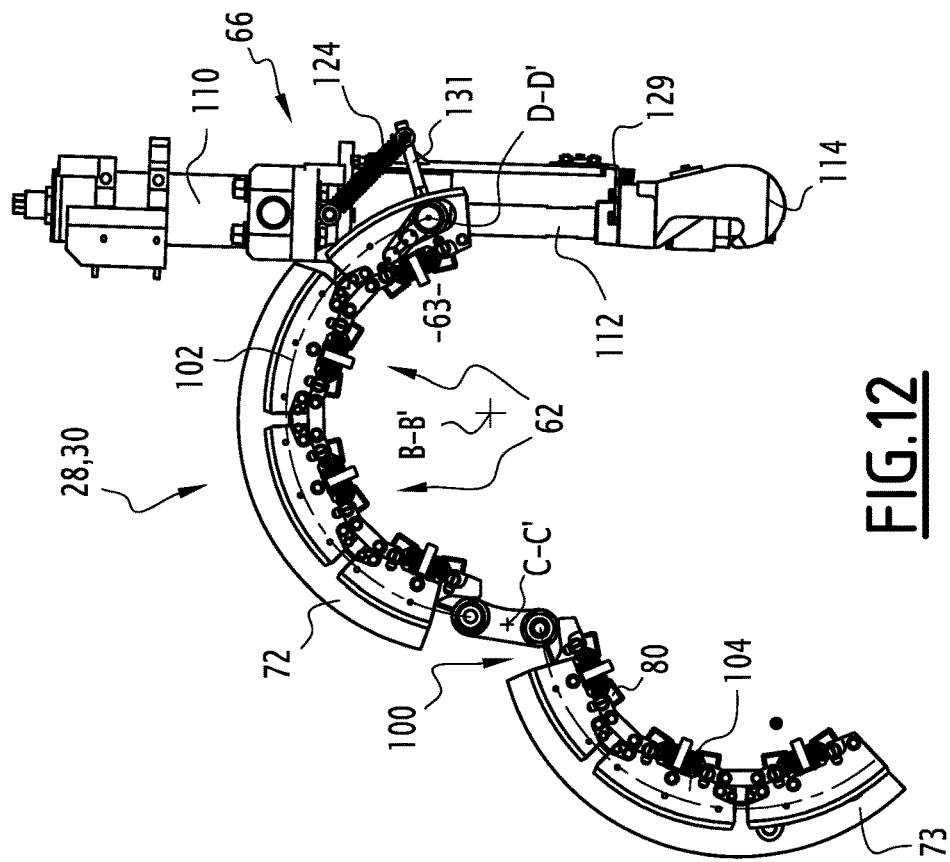
FIG. 12 is a top view of the clamp of FIG. 11, the clamp being open.

The rigid frame segments 72 are immobile relative to one another around the axis C-C' between an open configuration shown in FIG. 12, and a closed configuration shown in FIG. 11.

The mechanism includes a jack mounted on one of the rigid frame segments and a connecting rod connecting the jack to the other of the frame segments 73. In a variant, the mechanism includes a hydraulic torque key.

In the example shown in FIGS. 11 to 13, the deployment of a rod of the jack causes the closing of the frame 60, and the retraction of the rod causes the opening of the frame 72 by rotating the second frame segment 73 relative to the first frame segment 72.

To obtain a good distribution of forces, each clamp 28, 30 includes at least three contact pads 62, advantageously at least five contact pads 62, preferably at least seven contact pads 62. When the contact pads 62 have a jaw 80 including a V-shaped contact surface, with an opening angle of between 120° and 170°, preferably of 150°, the number of contact pads 62 is advantageously equal to seven to provide a good distribution of the forces in the inspection range of 30 cm (12 inches) to 46 cm (18 inches) in outside diameter for the production line 16.

The contact pads 62 are mounted mobile in the frame 60, while being connected to one another by the clamping belt 64.

Figure 15:
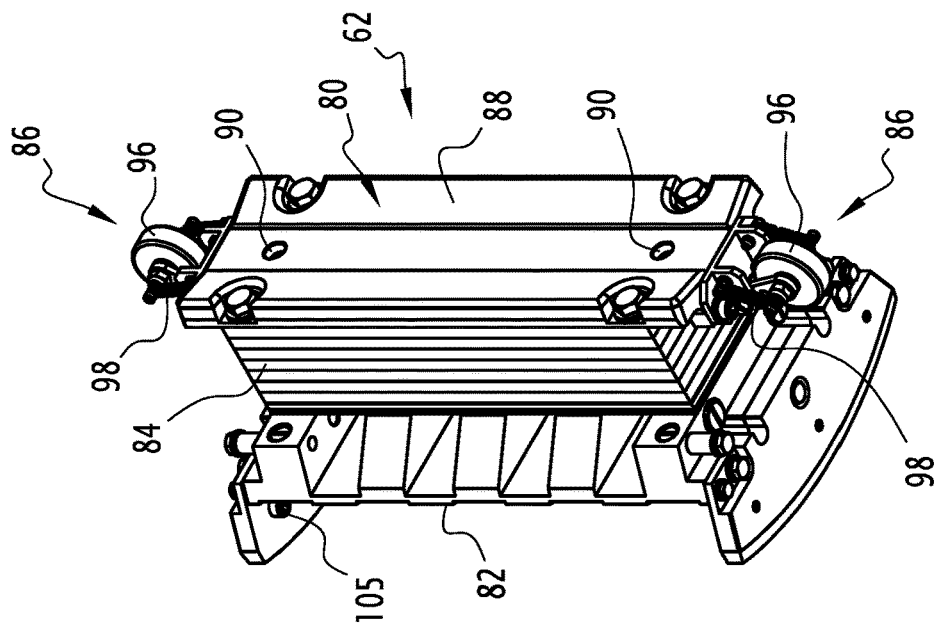
FIG. 15 is a perspective view of a clamping pad of the clamp of FIG. 11.
Figure 14:
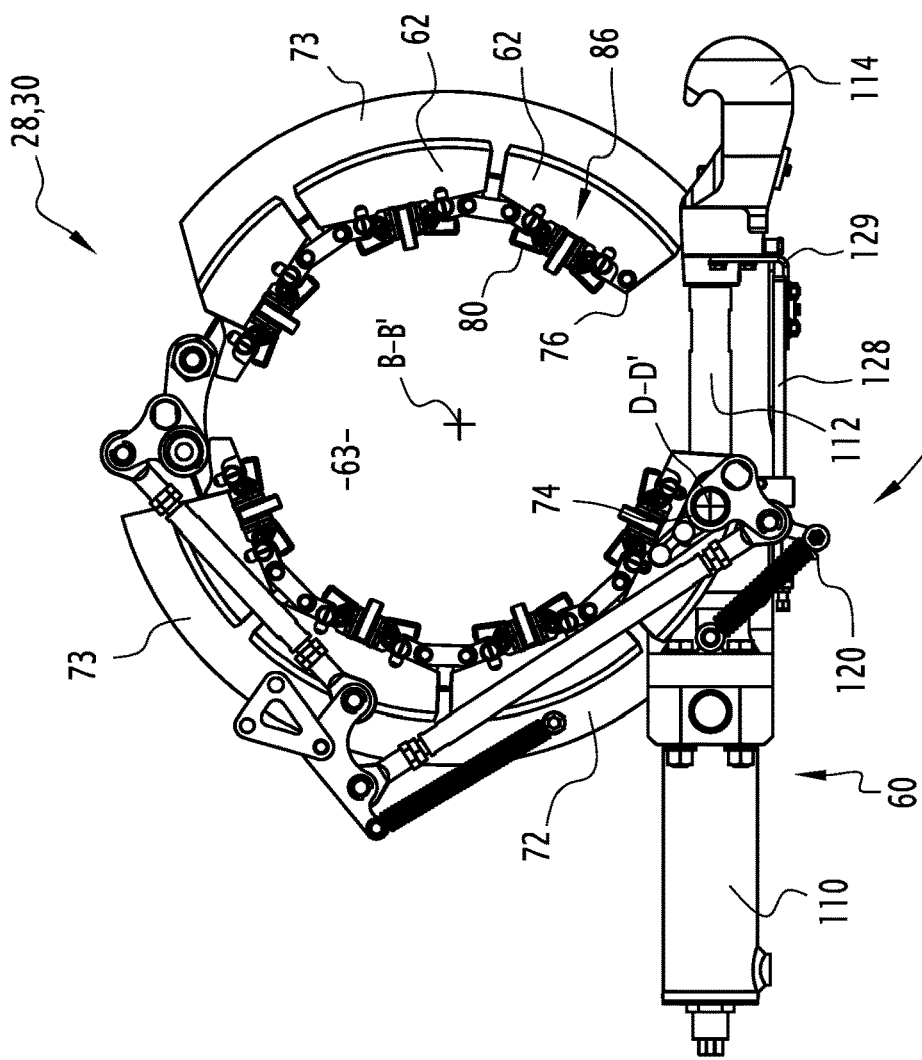

In reference to FIG. 15, each pad 62 includes a jaw 80 intended to come into contact with the production line 16, a guide support 82, receiving the jaw 80 and optionally, one or several spacers 84 inserted between the guide support 82 and the jaw 80 in order to position the jaw 80 radially in the central passage 63.

Each pad 62 further includes at least one radial push element 86, capable of loosening the pad 62 from the production line 16, during the loosening of the clamp 28, 30.

The jaw 80 is preferably made from aluminum, which provides an optimal compromise between mass, strength, manufacturing possibilities and cost. In a variant, other materials are used such as steel or titanium, a polymer, etc. The jaw 80 can include a contact surface that is planar, curved or V-shaped or that has any other shape suitable for one skilled in the art. When the contact surface is V-shaped, the opening angle of the V is advantageously between 120° and 170°.

The jaw 80 optionally includes a resilient coating. Preferably, the resilient coating is resilient along the radial component and is rigid along the axial component. This prevents the movements of the mobile inspection device 18 in the vertical direction and maintains a good precision in the measurements.

In reference to FIG. 15, the jaw 80 defines a concave inner contact surface 88 with the production line 16. It includes, radially facing the inner surface 88, rods 90 for mounting spacers 84 and for insertion in the guide support 82.

The inner surface 88 is advantageously rough or striated.

The spacers 84 are engaged in the rods 90 behind the jaw 80.

In a variant that is not shown, the guide support 82 includes, on either side of the pad 62, at least one circumferential guide member protruding laterally relative to the jaw 80 in order to cooperate with the guide support 82 of an adjacent pad 62 and at least one housing for receiving a circumferential guide member of an adjacent pad 62.

Advantageously, the guide support 82 includes, on either side of the pad 62, a plurality of circumferential guide members parallel to one another defining parallel receiving housings between them.

Thus, during the clamping of the clamp 28, 30, the adjacent pads 62 are capable of coming closer to one another laterally without travel along the axis B-B', while being guided by the cooperation between circumferential guide members on a pad 62 and the corresponding receiving housings on an adjacent pad 62.

In the example shown in FIGS. 11 and 15, each pad 62 comprises two radial push elements 86 protruding on either side of the pad 62, at the axial ends of the jaw 80.

Each radial push element 86 includes a rolling member 96 on the production line 16, radially mobile between a forward contact position with the production line 16, and a retracted position, and a member 98 for elastically biasing the rolling member 96 toward the forward position.

During the clamping of the clamp 28, 30, the rolling member 96 is capable of retracting by moving away from the axis B-B', against the elastic biasing member 98. On the contrary, during the loosening of the clamp 28, 30, the elastic biasing member 98 moves away from the rolling member 96 of the jaw 80, causing the loosening of the jaw 80 radially away from the production line 16.

In this example, the rolling member 96 is a rotary roller. In a variant, the rolling member 96 is a ball rolling in a spherical cage. In still another variant, the rolling member 96 is replaced by a bearing member, such as a ski on a leaf spring.

The elastic biasing member 98 is capable of exerting a radial force of several daN, for example between 1 daN and 50 daN.

Thus, the produced loosening is at least 0.1 mm, preferably at least 4 mm, and may reach up to 100 mm or more.

The clamping belt 64 is for example made with a base of a flexible band 100 arranged around the pads 62 to hold the pads 62. The flexible band 100 arranged behind the pads 62 includes a first part 102 connected to a first frame segment 72 and a second part 104 connected to a second frame segment 73. In order to avoid bending the flexible band 100 during opening of the clamp , the first part 102 can be connected to the second part 104 using an articulated junction part. This articulated junction part can in particular take the form of a single or double hinge. The connection between the flexible band 100 bearing the pads 62 and the frame segments 72, 73 allows a radial play between them.

The flexible band 100 is generally made from metal, preferably made from duplex stainless steel (for example grade 1.4462, E=200 Gpa, Rm=640 MPa at 20° C.) but can also be made from composite material. It has a thickness of between 1 mm and 10 mm, preferably 4 mm, and a height of between 100 mm and 600 mm, preferably greater than 300 mm.

The flexible band 100 is advantageously bent before mounting to give it the initial shape.

In a variant, the clamping belt 64 includes several flexible bands 100 with smaller dimensions relative to what has just been described.

The flexible band 100 is arranged behind guide supports 82 of the pads 62, forming flexible hinges between the successive pads 62, to allow a circumferential movement of the pads 62 relative to one another.

The flexible band 100 is simply pressed behind the supports 82. Screw heads 105 (CHC or the like, visible in FIG. 15) screwed in the supports 82 on either side of the flexible band 100 prevent the pads 62 from detaching from the flexible band 100. During clamping, the flexible band 100 slides inside a rail formed behind the guide supports 82 and the screw heads. Preferably, the supports 82 each include at least three screws.

The surface behind the guide supports 82 is preferably curved. The surface behind the guide supports 82 is advantageously straightened so as to favor the sliding of the flexible band 100 and advantageously to limit the winch effect during clamping of said flexible band 100. A layer of plastic favoring the sliding can also be installed behind the guide supports 82, between the flexible band 100 and the pads 62.

The clamping belt 64 is thus capable of being maneuvered jointly with the frame 60 between the open configuration of FIG. 12 and the closed configuration of FIG. 11, in which it is loosened.

Figure 17:
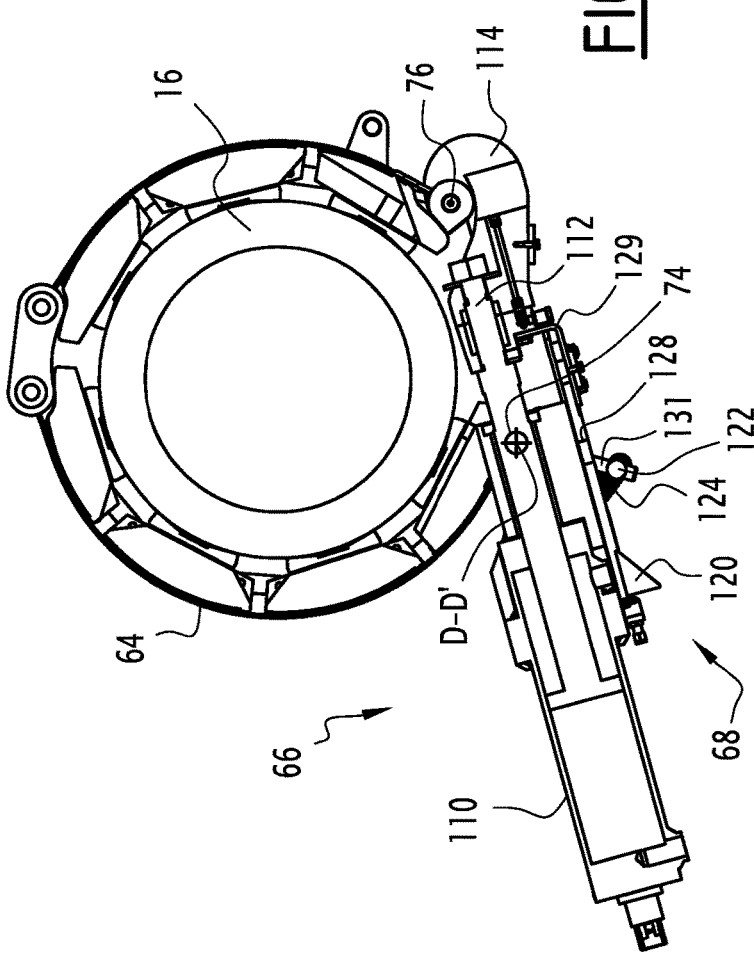
FIG. 17 is a view similar to FIG. 16, in a grasping configuration of the attaching point.

The second part 104 of the belt 64 further defines a second point 76 capable of being grasped by the clamping actuator 66, to take the belt into a clamping configuration around the production line 16, illustrated by FIG. 17.

To reach the unclamped configuration, the clamp 28, 30 reaches a circumference value with a diameter equal to the nominal diameter plus the necessary play as described above (at least 0.1 mm, preferably at least 4 mm and in particular up to 100 mm or more).

This loosened configuration is midway between the clamping configuration and the open configuration.

The second point 76 is for example defined on a longitudinal bar carried by an end pad 62.

In reference to FIGS. 12 to 14 and 16 to 17, the clamping actuator 66 is formed by a jack including a chamber 110 and a grasping member 112 deployable from the chamber 110.

The grasping member 112 includes, at its free end, a hook 114 intended to grasp the second point 76.

Figure 16:
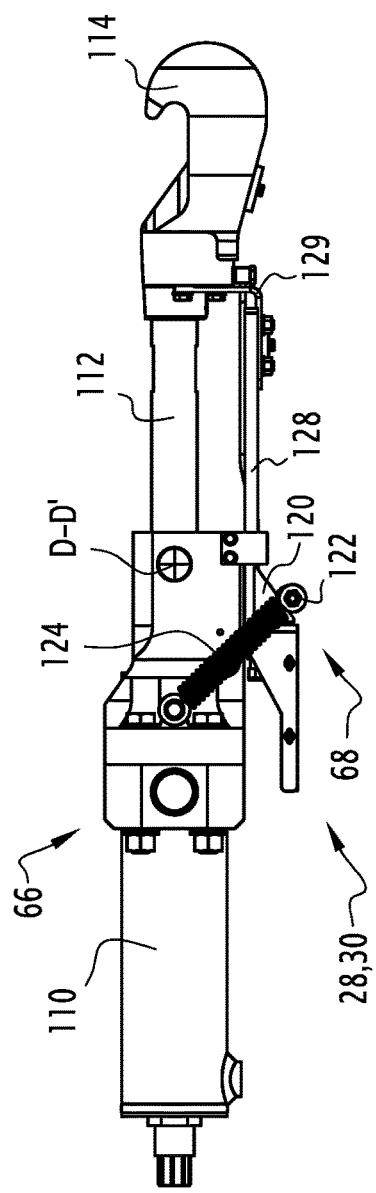
FIG. 16 is a top view of a clamping actuator of the clamp of FIG. 11, in a configuration separated from an attaching point.

The grasping member 112 is translatable along a travel axis in the chamber 110 between a deployed position, visible in FIG. 16, and a retracted position, visible in FIG. 17 to bring the second point 76 closer to the first point 74 when the grasping member 112 has grasped the second point 76.

The tightening actuator 66 is further articulated on the frame 60 around an axis D-D' parallel to the axis B-B' of the passage 63, the axis D-D' passing through the first point 74.

Thus, the chamber 110 and the grasping member 112 are movable jointly in rotation about the axis D-D' between a grasping configuration of the second point 76 and a configuration radially separated from the second point 76, to allow the closing respectively of the opening of the frame 60 and the clamping belt 64.

The travel axis of the grasping member 112 is advantageously perpendicular to the axis D-D'.

In the grasping configuration (FIG. 17), the free end of the grasping member 112 and the travel axis have come closer to the axis B-B' of the central passage 63. On the contrary, in the radially separated configuration (FIG. 16), the free end of the grasping member 112 and the travel axis have moved further from the axis B-B' of the central passage 63.

According to the invention, the radial separating mechanism 68 includes at least a first cooperating member 120 by cam effect, movable jointly with the grasping member 112, and a second cooperating member 122 by cam effect, capable of cooperating with the first cooperating number 120, the second cooperating member 122 being secured to the frame 60 and/or the belt 64.

The radial separating mechanism 68 further includes an elastic biasing member 124, capable of returning the grasping member 112 toward the grasping configuration, and advantageously, a mechanical connecting member 126 between the grasping member 112 and the first cooperating member 120.

In the example shown in FIGS. 11 and 12, the first cooperating member 120 is a cam, preferably with an inclined profile. The second cooperating member 122 is a cam follower, advantageously with a curved profile.

The slope of the curved profile is for example between 10° and 60°.

In a variant (not shown), the second cooperating member 122 is a cam, the first cooperating member 120 being a cam follower.

The mechanical connecting member 126 includes a lateral plate 128, mounted parallel to the translation axis of the grasping member 112. The plate 128 is transversely connected to the grasping member 112, here by means of a bracket 129. It is guided along the chamber 110.

The first cooperating member 120 is mounted on the plate 128. It protrudes laterally relative to the plate 128, opposite the chamber 110, outside the frame 60.

The elastic biasing member 124 is articulated at a first end on an arm 131 secured to the frame 60, and at a second end on the chamber 110. It is for example formed by a helical spring.

The elastic biasing member 124 is capable of returning the second end of the elastic biasing member 124 into the vicinity of its first end to cause the grasping member 112 to pivot from the separated configuration to the grasping configuration.

In the deployed position of the grasping member 112, shown in FIG. 16, the first cooperating member 120 is placed in mechanical contact with the second cooperating member 122. By cam effect, the mechanical cooperation between the members 120, 122 pushes the chamber 110 toward the axis B-B' of the passage 63 and radially separates the free end of the grasping member 112 away from the axis B-B' of the passage 63. This also causes the extension of the elastic biasing member 124.

When the grasping member 112 retracts into the chamber 110, the incline of the cam causes the progressive rotational travel of the free end of the grasping member 112 toward the axis B-B'.

From an intermediate position of the grasping member 112 between the deployed position and the retracted position, visible in FIG. 17, the first cooperating member 120 ceases to cooperate by cam effect with the second cooperating member 122. The grasping member 112 then occupies its grasping configuration of the second point 74, up to the retracted position.

In reference to FIG. 2, the longitudinal travel mechanism 50 includes at least one longitudinal jack 140 longitudinally connecting the clamps 28, 30. In the example shown in FIG. 2, the longitudinal travel mechanism 50 includes two longitudinal jacks 140 arranged laterally on either side of the clamps 28, 30.

Each longitudinal jack 140 comprises a cylinder 142 articulated on the frame 60 of the inspection support 24 and a rod 144 deployable from the cylinder 142. The deployable rod 144 is articulated on the lower clamp 30 at its free end.

The travel of the rod 144 is generally greater than 100 mm, able to reach up to 0.5 m or more.

Each longitudinal jack 140 extends parallel to the axis B-B' of the clamps 28, 30 when the clamps 28, 30 are parallel to one another.

The jacks 140 are substantially coplanar, the plane defined by the jacks 140 being as close as possible to the axis of the production line 16 so as to distribute the forces on either side of the production line 16, for example at a distance of between 60 mm and 120 mm from the axis of the production line 16.

The jacks 140 are advantageously arranged in a plane containing or at least as close as possible to the axis of the production line 16 in order to balance the forces and limit the moments applied on the production line 16.

The plane defined by the jacks 140 is preferably inclined by one or several degrees relative to the axis of the production line 16, such that the moments around the axis A-A' of the production line 16 resulting from tangential forces of the jacks 140 on the clamps 28, 30 cancel each other out. Indeed, the two ends of each of the jacks 140 are generally articulated on the clamps 28, 30 by means of swivel links, or pivot links. Thus, when the jacks 140 deploy, a risk remains of the jack 140 tilting relative to the axis of the production line 16 and stretching to cause a rotation of one clamp 28, 30 relative to the other around the axis B-B'. If the second jack follows the movement initiated by the first jack, the rotational movement will then be amplified.

This problem is resolved by pre-inclining the jacks 140, such that they cannot be inclined in concert, but their inclines generate, on the clamps 28, 30, moments with axis B-B' that oppose one another and cancel one another out.

The longitudinal travel mechanism 50 is capable of moving the lower clamps 30 relative to the upper clamp 28 in translation parallel to the axis B-B' of the central passage 63, coaxial with the axis A-A' of the production line 16, between a closed position, visible in FIG. 3, and a separated position, visible in FIG. 2.

Figure 8:
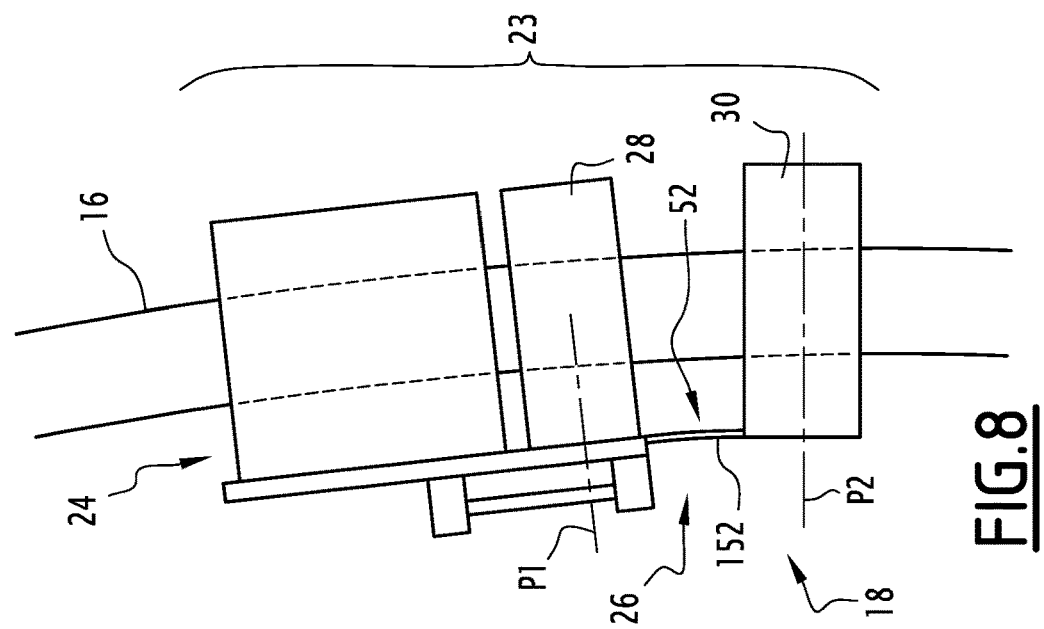
FIGS. 8 to 10 illustrate various tilted configurations of the clamps of the device relative to one another using the mechanism of FIG. 6.
Figure 7:
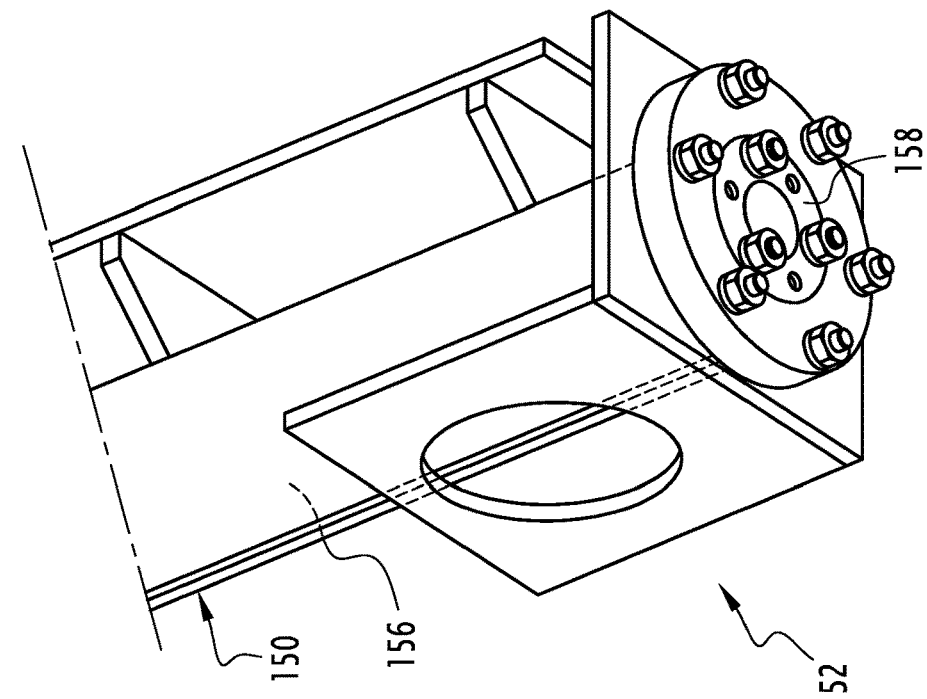
FIG. 7 is a bottom view of a detail of the mechanism of FIG. 6.
Figure 10:
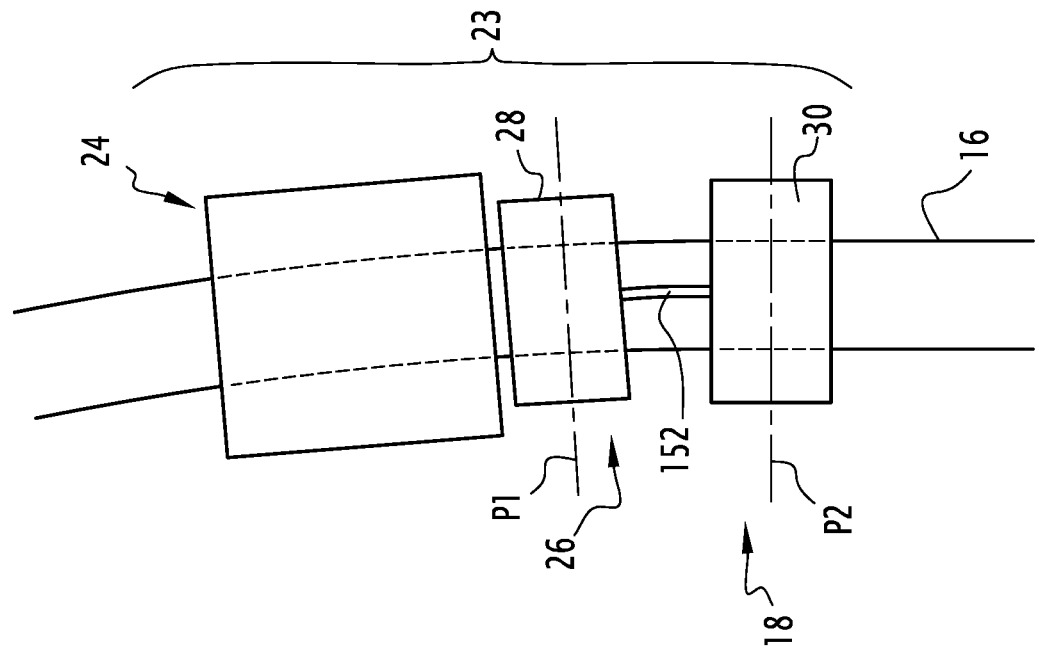
Figure 9:
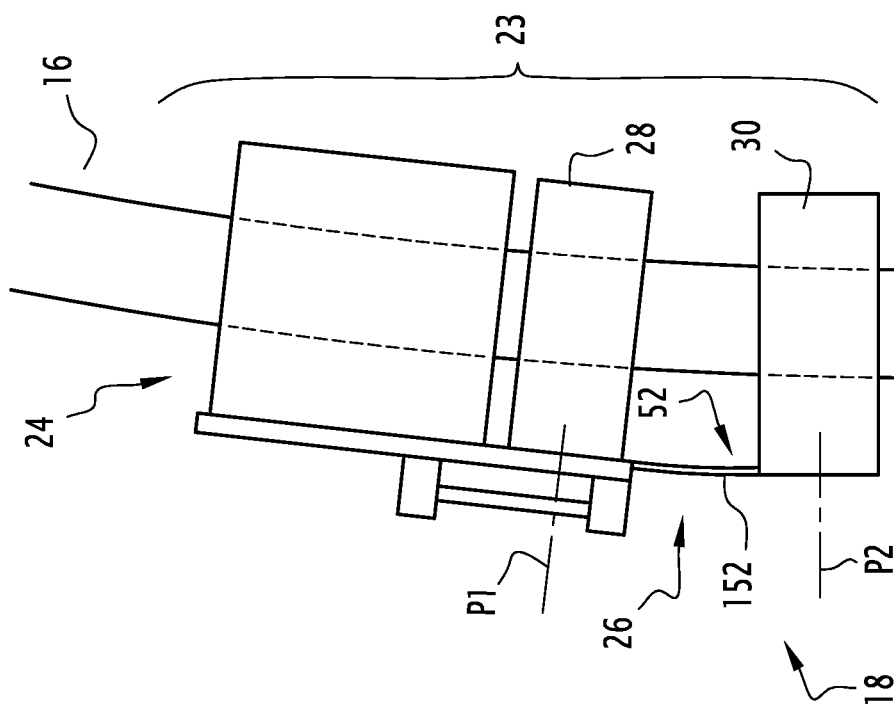

The tilting mechanism 52 is capable of allowing a movement of the clamps 28, 30 in rotation relative to one another around an axis perpendicular to the axis A-A' of the production line 16 between a position parallel to one another, visible in FIGS. 2 and 3, and at least one position inclined relative to one another, examples of which are visible in FIGS. 8 to 10, for the passage of an inclined part 23 of the production line 16.

Figure 6:
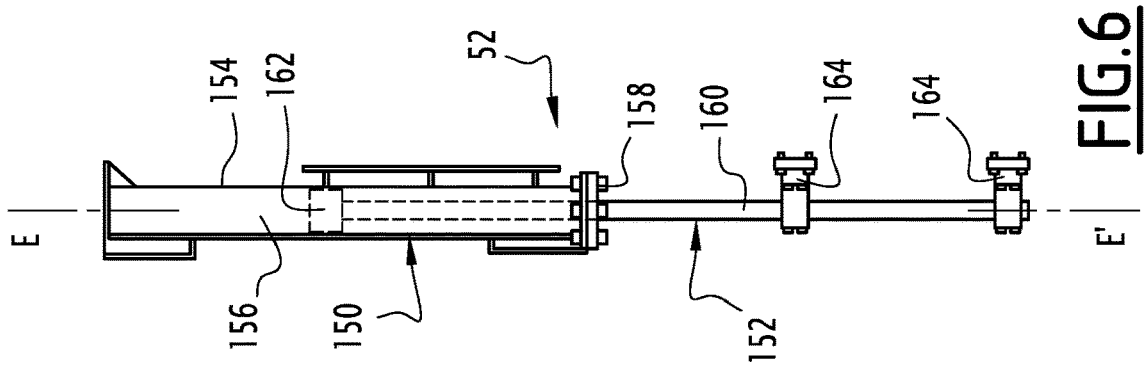
FIG. 6 is an elevation view of a mechanism for relative tilting of one clamp relative to the other.

In reference to FIG. 6, the tilting mechanism 52 includes a hollow jacket 150 and a flexion bar 152 protruding outside the hollow jacket 150. The flexion bar 152 is able to go from a straight configuration, in the parallel position of the clamps 28, 30, to at least one curved configuration, in the inclined position of the clamps 28, 30.

The minimum curve radius of the production lines 16 on which the mobile inspection device 18 moves is advantageously 50 m.

The hollow sleeve 150 extends parallel to the axis B-B' of the central passage 63, perpendicular to the frame 60 of the inspection support 24 and behind the latter. The frame 60 is fastened on the hollow jacket 150.

The upper clamp 28 also extends perpendicular to the hollow jacket 150. It is mounted stationary on the hollow jacket 150.

The hollow jacket 150 includes a tube 154 defining a housing 156 for circulation of the flexion bar 152, and a lower guide sleeve 158, closing a housing 156 at its lower end to guide the flexion bar 152.

The flexion bar 152 includes a deformable rod 160, a guide head 162 inserted in the housing 156, and fasteners 164 for fastening the lower clamp 30.

The deformable rod 160 has an outer diameter smaller than the inner diameter of the housing 156 to delimit an annular space in the housing 156. It has an outer diameter with a shape complementary to that of the guide sleeve 158.

The deformable rod 160 preferably has a hollow or solid circular section so as to allow flexion in all of the directions radial to the deformable rod 160. Indeed, depending on the position of the mobile inspection device 18 on the production line 16, the flexion occurs in different directions (convex side, concave side or intermediate positions.

A circular section also gives good elasticity, so as to oppose the rotation of one clamp 28, 30 relative to the other.

The deformable rod 160, when it is solid, has a diameter of between 10 mm and 30 mm. When it is hollow, the deformable rod 160 has a thickness of between 3 mm and 5 mm and an outer diameter of between 30 mm and 50 mm.

The deformable rod 160 is made from metal, for example aluminum, stainless steel or titanium.

Advantageously, the deformable rod 160 is made from a material with a Young's modulus E of less than 220 GPa, preferably less than 130 GPa, and an elastic limit Re advantageously greater than 300 MPa, preferably greater than 1000 MPa.

The preferred material is titanium (E=105 GPa and Re greater than 1000 MPa) for its greater elastic strength and its Young's modulus lower than steel.

In a variant, the deformable rod is made from a composite material.

The guide head 162 protrudes radially relative to the rod 160. It has a shape complementary to that of the housing 156. It is capable of sliding in the housing 156 up to the guide sleeve 158.

The head 162 and the guide sleeve 158 are advantageously made from plastic, for example high-density polyethylene to have a low friction coefficient and a low water absorption.

In the example of the figures, the fasteners 164 connect the lower clamp 30 to a lower part of the flexion bar 152. The lower clamp 30 extends perpendicular to the flexion bar 152.

The flexion bar 152 is translatable along the axis E-E' of the hollow jacket 150, while being guided by the hollow jacket 150, during the travel of the lower clamp 30 relative to the upper clamp 28.

Furthermore, the flexion bar 152 is able to go from a straight configuration, in the axis E-E' of the jacket 150, to a curved configuration, advantageously in the shape of an arc of circle.

In the straight configuration, the clamps 28, 30 are parallel to one another. The plane P1 perpendicular to the axis B-B' of the central passage 63 of the clamp 28 is parallel to the plane P2 perpendicular to the axis B-B' of the central passage 63 of the clamp 30.

In the curved configuration, the flexion bar 152 has a curve radius greater than 50 m (which is the minimum curve radius of the production line 16) and in particular between 50 m and infinity when the production line 16 is rectilinear. The respective planes P1, P2 of the clamps 28, 30 are inclined relative to one another by a non-nil angle smaller than 3° and in particular between 0° and 3°, 0° being when there is no curve.

The resiliency of the flexion bar 152 is capable of bringing the free edges of the clamps 28, 30, located facing the flexion bar 152, closer to one another relative to their parallel position (see FIG. 9) or on the contrary moving them further away from one another relative to their parallel position (see FIG. 8).

The flexion bar 152 is located behind the clamps 28, 30, substantially midway from the longitudinal jacks 140. The clamps 28, 30 are thus received in the space with triangular cross-section defined between the flexion bars 152, a first longitudinal jack 140, and a second longitudinal jack 140.

This prevents the relative rotation of the clamps 28, 30 about the axis E-E' of the jacket 150. The flexion bar 152 acts as a spring that exerts a moment opposing the rotational movement and that tends to return the clamps 28, 30 into the same axis.

The operation of the mobile inspection device 18 according to the invention, during an inspection campaign of the production line 16, will now be described.

Initially, the mobile inspection device 18 is lowered into the body of water 12 from the surface assembly 14 or a ship separate from the surface assembly 14.

The mobile inspection device 18 is advantageously coupled to an underwater remotely operated vehicle (ROV) by means of an interface 160 secured to the frame 60.

The mobile inspection device 18 is then brought into the vicinity of the production line 16. The clamps 28, 30 are opened.

To that end, the clamping actuator 66 is deactivated. The grasping member 112 occupies its deployed position. The radial separating mechanism 68 is active, the first cooperating member 120 then cooperating with the second cooperating member 122 by cam effect to keep the grasping member 112 in its separated configuration.

The opening mechanism is operated to move the frame segments 72, 73 relative to one another and open access to the central passage 63.

Then, the production line 16 is introduced into the opening 34 of the inspection support 24 and into the central passages 63 of the clamps 28, 30.

The clamps 28, 30 are then closed. The opening mechanism is actuated to move the frame segments 72, 73 into contact with one another again and close the central passage 63 around the production line 16, as illustrated by FIG. 13.

During this passage, the second part of the belt 64 comes closer to the first part 102. The pads 62 are arranged around the outer surface 22 of the production line 16.

This being done, the grasping member 112 is moved toward the retracted position in the chamber 110. During this travel, the grasping member 112 gradually comes closer to its grasping configuration by relative travel of the first cooperating member 120 relative to the second cooperating member 122, and by retraction of the elastic biasing member 124.

When the grasping member 112 reaches its intermediate position, the first cooperating member 120 disengages from the second cooperating member 122 and the grasping member 112 then occupies its grasping configuration of the second point 76.

The hook 114 at the free end of the grasping member 112 engages on the bar at the second point 76 and gradually brings the second point 76 closer to the first point 74.

The pads 62 then press radially on the outer surface 22 of the production line 16 and gradually grip the production line 16, applying a clamping pressure on the production line 16 as defined above.

The mobile device 18 being situated in the body of water 12, the floats 31 provide buoyancy to the mobile inspection device 18.

The sensors 25 are then brought into contact with or into the vicinity of the outer surface 22 of the production line 16 by means of the travel mechanism 40. Optionally, the rotary plate 38 is rotated around the axis A-A' of the production line 16 to allow an appropriate movement of the sensors 25 and/or sweeping of a circumference of the outer surface 22 by the sensors 25.

This being done, the mobile inspection device 18 is moved along the production line 16. Starting for example from the position of FIG. 3, in which the clamps 28, 30 are brought closer to one another, and when the mobile inspection device 18 must rise along the production line 16, the upper clamp 28 is loosened, while the lower clamps 30 remains clamped against the production line 16.

Each longitudinal jack 140 of the longitudinal movement mechanism 50 is then activated to separate the upper clamp 28 from the lower clamp 30 and to raise the upper clamp 28 and the inspection support 24 jointly to reach the configuration of FIG. 2.

During this travel, the flexion bar 152 gets out of the upper jacket 150. The flexion bar 152 is guided on the one hand by the sliding of the guide head 162 in the housing 156, and on the other hand by the sliding of the rod 160 in the guide sleeve 158.

The upper clamp 28 is then clamped on the outer surface 22 of the production line 16 and the lower clamp 30 is loosened.

Each longitudinal jack 140 is then retracted to return the lower clamp 30 into the vicinity of the upper clamp 28, as illustrated by FIG. 3.

The preceding actions are then repeated until the mobile inspection device 18 reaches the desired position on the production line 16.

The flexion bar 152 flexes under the effect of the moving clamp 28, 30, which, by sliding/rolling along the production line 16, follows the curve of the production line 16.

During the passage of a curved part 23 of the production line 16, when the flexion bar 152 is positioned at the concave side of the curved part 23, the free edges of the clamps 28, 30 move away from one another and the flexion bar 152 goes from its straight configuration to its curved configuration, as illustrated by FIG. 8.

On the contrary, when the flexion bar 152 is positioned at the convex side of a curved part 23 of the production line 16, the free edges of the clamps 28, 30 come closer to one another and the flexion bar 152 bends as shown in FIG. 9.

When the flexion bar 152 is positioned laterally relative to the concave side and the convex side of the curved part 23, as illustrated by FIG. 10, the upper clamp 28 is inclined relative to the lower clamp 30, without their free edges coming significantly coming closer together and the flexion bar 152 bends.

When the mobile inspection device 18 is oriented perpendicular to the plane containing the concave side and the convex side, the flexion of the clamps 28, 30 is therefore done laterally instead of front to back (or vice versa). When the mobile inspection device 18 is in an intermediate position, the flexion of the clamps 28, 30 is done in an intermediate direction.

The presence of a flexion bar 152 arranged between the clamps 28, 30 provides an easy passage for the curved parts 23 of the production line 16, irrespective of the curvature configuration of the curved part 23, and the relative position of the clamps 28, 30 with respect to the production line 16, without significant rotation of the clamps relative to one another about the axis E-E' of the bar 152. The clamps 28, 30 therefore remain placed facing one another, even inclined relative to one another.

The mobile inspection device 18 therefore moves efficiently on the production line 16, by adopting the configuration of the production line 16. This is obtained via simple and inexpensive mechanical means, which do not require active and sophisticated control or substantial maintenance. In particular, no rigid connection via a guideway or the like exists between the two clamps 28, 30. The mobile inspection device 18 adapts naturally to the curve of the production line 16, which guides its movement.

When the mobile inspection device 18 reaches the surface of the body of water 12, its buoyancy decreases.

The nominal clamping pressure applied on the outer surface 22 of the production line 16 is generally between 2 bar and 90 bar, and advantageously between 2 and 40 bar. Preferably, and in order for the mobile inspection device 18 to be able to adapt and move over a large number of different production lines 16, in particular flexible pipes, while respecting the most conservative standards, the nominal clamping pressure applied on the outer surface 22 of the production line 16 is between 10 bar and 40 bar.

The clamping force applied by each clamp 28, 30 is thus between 20 kN and 1000 kN, preferably between 40 kN and 700 kN. In practice, the clamping force applied by each clamp 28, 30 is advantageously between 50 kN and 200 kN to allow the inspection of the rigid pipes and umbilicals and advantageously between 130 kN and 700 kN for the inspection of both the flexible pipes and rigid pipes and umbilicals.

Thus, the mobile inspection device 18 moves easily at the interface between the body of water 12 and the volume of air located above the body of water 12, in the partial or total absence of buoyancy, while being subject to the local movements of the surface of the body of water, in particular the waves and the swell.

The mobile inspection device 18 next moves above the surface of the body of water 12 to inspect the part of the production line 16 connected to the surface assembly 14. This makes it possible to inspect the upper part of the production line 16. This is advantageous in particular for flexible pipes, since it is possible to inspect the production line 16 up to the stiffness, inside the I- or J-shaped guide tubes. This for example allows an ultrasound inspection of the armor yarns into the endpiece of the production line 16.

Such an inspection is possible owing to the optimized clamping force of each clamp 28, 30, allowing stable catching even without buoyancy, with a relatively reduced spatial bulk and weight relative to a caterpillar system. Furthermore, the applied clamping pressure remains appropriate not to exceed the load conditions on the production line 16, or damage the outer surface 22 of the production line 16, in particular when the latter is a flexible pipe.

The mobile inspection device 18 is therefore particularly versatile, since it can work in the body of water 12, on the surface of the body of water 12, and in a volume of air located above the body of water 12, without it being necessary to take special precautions, or maneuver the mobile inspection device 18 specifically using a crane or other surface equipment. No outside assistance is necessary from the surface assembly 14, which greatly limits the risk and preparation time of the installation 10.

Advantageously, the inspection of the production line 16 using the mobile inspection device 18 can be done during the fluid transport through the production line 16, in particular in production.

The holding of the mobile inspection device 18 by the clamps 28, 30 guarantees very stable positioning of the inspection support 24, to ensure very precise integrity measurements of the production line 16 by means of the sensors 25.

Figure 18:
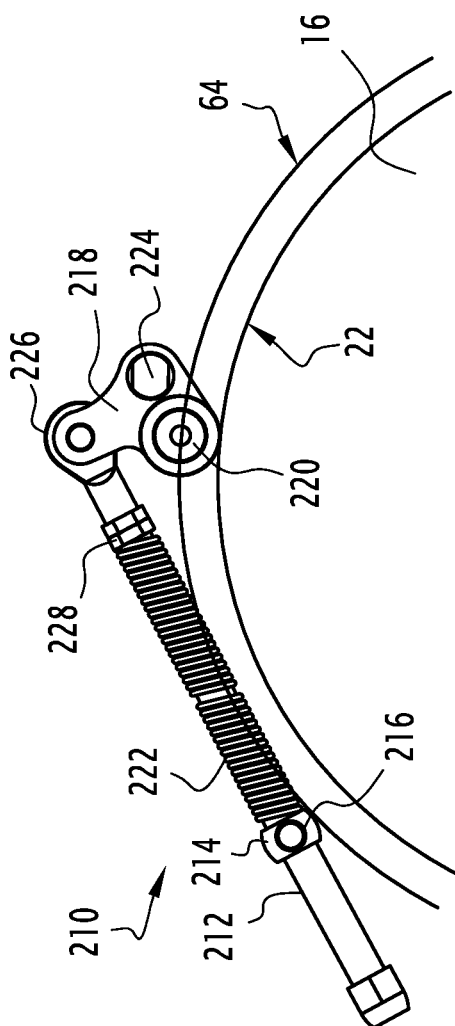
FIGS. 18 to 19 are views illustrating an additional actuator for separating of the band.
Figure 19:
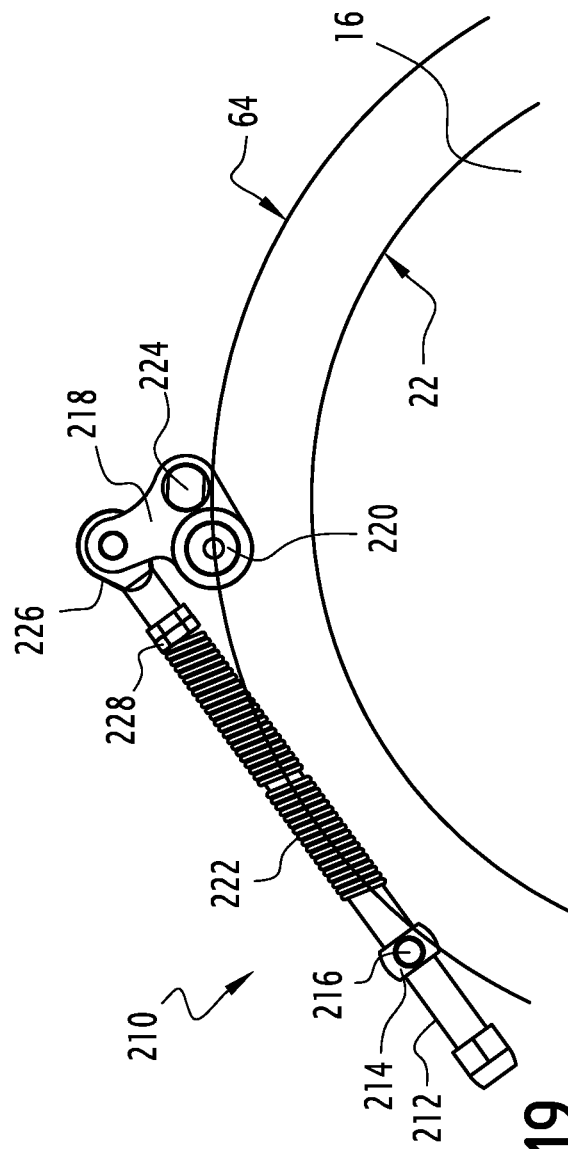

In a variant, the clamp 28, 30 includes an additional actuator 210 for loosening of the belt 64, visible in FIGS. 18 and 19.

The additional actuator 210 includes an opening rod 212, a pivoting support 214 for articulating the rod 212 a first articulation point 216 on the frame segment 72 or 73 and a mobile lever 218, connected on the one hand on the opening rod 212 and on the other hand on a pivot 220 secured to a first point of the belt 64.

The additional actuator 210 further comprises at least one member 222 for elastic biasing of the rod 212, to return the clamping belt 64 to the loosened configuration.

The pivoting support 214 is mounted rotating about an axis parallel to the axis B-B'. It defines a passage transverse to its rotation axis, in which the rod 212 is mounted sliding. Thus, the rod 212 is capable of being rotated jointly with the pivoting support 214. It is capable of sliding transversely relative to the sliding support 214 in the transverse passage.

The mobile lever 218 is mounted pivoting about an axis 224 that is stationary relative to a frame segment 72, 73, parallel to the axis B-B'.

One end 226 of the rod 212 is articulated on one side of the lever 218 relative to the rotation axis 224. The pivot 220 is articulated on another side of the lever 218 relative to the rotation axis 224.

The elastic biasing member 222 is mounted about the rod 212. It is inserted between a surface of the support 214 and an opposite stop 228 secured to the rod 212.

In the clamping configuration of the belt 64, as illustrated in FIG. 18, the pivot 220 is kept relatively close to the outer surface 22 of the production line 16. The belt 64 is then brought closer to the outer surface 22 of the production line 16.

In this configuration, the end 226 of the rod 212 is relatively closer to the support 214 and the length of the rod 212 protruding past the support 214 is maximal.

The elastic biasing member 222 is compressed between the support 214 and the stop 228.

During the loosening of the belt 64, as illustrated by FIG. 19, the elastic biasing member 222 deploys by pushing the end 226 of the rod 212 away from the outer surface 22 of the production line 16. This movement causes the sliding of the rod 212 in the support 214 to decrease the rod length 212 protruding past the support 214.

At the same time, the lever 218 is rotated about the axis 224, causing the travel of the pivot 220 away from the outer surface 22 of the production line 16. This opens the belt 64.

Figure 20:
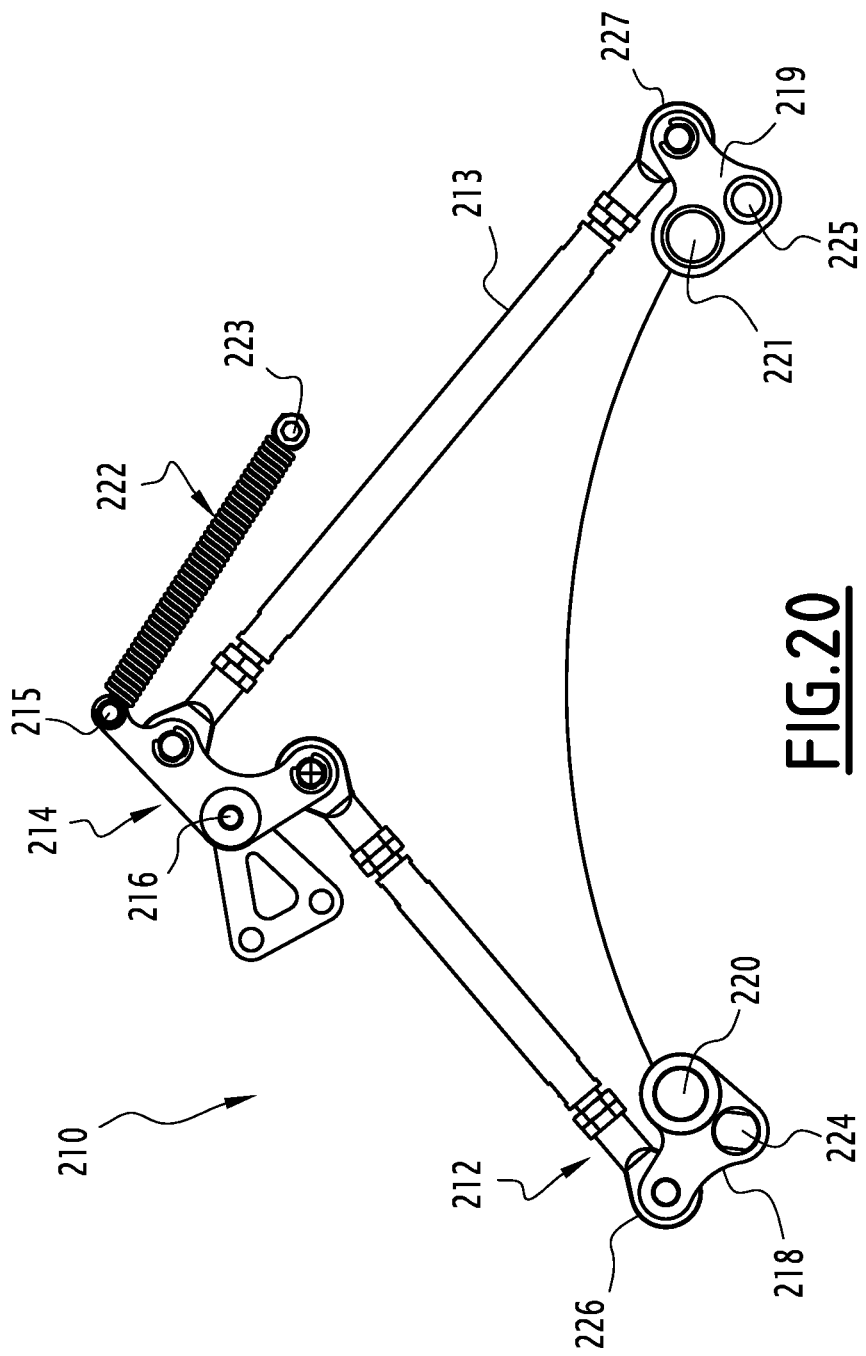
FIG. 20 is a view similar to FIG. 17 of another additional actuator for separating of the band.

A variant of an additional actuator 210 is illustrated by FIG. 20.

The additional actuator 210 illustrated by FIG. 20 differs from that shown in FIGS. 18 and 19 in that the rod 212 is articulated on the pivoting support 214 without sliding relative thereto. The additional actuator 210 further includes a second opening rod 213, the pivoting support 214 also articulating the second opening rod 213 at the same first fixed articulation point 216 relative to a frame segment 72, 73, parallel to the axis B-B' and a mobile lever 219, connected on the one hand on the second opening rod 213 and on the other hand on a pivot 221 secured to a second point of the belt 64.

The mobile lever 219 is mounted pivoting about an axis 225 that is stationary relative to a frame segment 72, 73, parallel to the axis B-B'. One end 227 of the rod 217 is articulated on one side of the lever 219 relative to the rotation axis 225. The pivot 221 is articulated on another side of the lever 219 relative to the rotation axis 225.

The operation of the second opening rod 213 is identical to that of the first opening rod 212.

In one variant, the lower clamp 30 is mounted stationary relative to the inspection support 24, and the upper clamp 28 is mounted mobile relative to the lower clamp 30 by means of the mechanism 50.

In one variant, the number of clamps 28, 30 is greater than two.

The clamps 28, 30 shown in the figures are each provided without a longitudinal travel device along the axis B-B', in particular caterpillar, situated in the clamp 28, 30, in particular around the central passage 63.

In still another variant, the assembly 26 for catching onto and traveling along the production line 16 comprises a clamp 28 provided with at least three caterpillars, advantageously five caterpillars, preferably seven caterpillars. Each caterpillar assumes the form of an assembly of links on which contact pads with the production line 16 are mounted. The contact pads are preferably metallic, preferably made from steel or aluminum, but could be made from composite material. Each contact pad includes a contact surface intended to come into contact with the production line 16. The contact surface can be smooth, rough or striated.

Each caterpillar includes an inner contact surface with the production line 16, defining the central passage 63 for insertion of the production line 16, with axis B-B'. The inner contact surface of each caterpillar is defined by the set of contact surfaces of the contact pads of the caterpillar that are oriented toward the inside of the central passage 63. The inner contact surface of the caterpillars extends over a length advantageously of between 0.6 m and 2 m, preferably between 1 m and 1.4 m.

The clamp 28 comprises a support structure. For each of the caterpillars, a reinforcing chassis is mounted movably on the support structure, in particular mounted radially movably relative to the axis B-B' so as to be able to adapt the separation of the caterpillars to the diameter of the production line 16. The reinforcing chassis or chasses can be driven in their mobility using one or several hydraulic jacks which, in addition to the radial travel of the reinforcing chasses, also make it possible to apply, by means of the caterpillars, a radial clamping pressure on the line 16 as described, calculated or measured beforehand.

Each reinforcing chassis is configured to guide a caterpillar and thus includes one or several guide elements on which the caterpillar travels. In particular, the guide element(s) can assume the form of rollers mounted rotatably on a rigid body. Thus, the links of the caterpillar roll on the rollers as it moves around the rigid body of the reinforcing chassis. Each reinforcing chassis can also include a tension means of the caterpillar assuming the form of one or several tension rollers.

The caterpillars are each rotated around at least one motorized gear wheel, generally mounted freely rotating on the rigid body of the reinforcing chassis, and the teeth of which engage with the chain links. The motorisation of the gear wheel is provided using an electric or hydraulic motor.

The clamp also comprises an opening mechanism making it possible to retract a sufficient number of reinforcing chassis and caterpillar assemblies so as to allow the passage of the production line 16 from a position located outside the central passage 63 to a position located inside the central passage 63.

In order for the measurements to be effective at the splash zone, the axial movement of the mobile device 18 under the effect of the swell is limited.

To that end, the caterpillar is rigid, for example by being formed from steel links. The caterpillar clamp is advantageously provided with a device allowing the rotational blocking of the motor shafts of the caterpillar, when the caterpillar is stopped.

In a variant, the clamps 28, 30 have a structure different from that illustrated by FIGS. 10 to 16. In particular, the clamps advantageously have no mechanism 68 for radial separation of the grasping member 112.

Moreover, the clamps 28, 30 capable of applying a nominal clamping pressure of between 2 bar and 90 bar to the production line 16.

The invention claimed is:

1. A movable device to inspect a production line intended to be partially submerged in a body of water, including:
   an inspection support bearing at least one sensor configured to be positioned facing the production line;
   an attaching and moving assembly configured to attach to and to move on the production line, the attaching and moving assembly being connected to the inspection support,
   the attaching and moving assembly including at least two clamps configured to be selectively actuated to grip onto the production line, each clamp delimiting a central passage having a longitudinal axis, the central passage being configured to receive the production line,
   the clamps being longitudinally movable relative to one another along the production line, the attaching and moving assembly comprising an active mechanism configured to move the clamps longitudinally relative to one another, the active mechanism comprising a first longitudinal jack mounted on the first side of the clamps, and a second longitudinal jack, mounted on a second side of the clamps,
   the attaching and moving assembly including a tilting mechanism configured to tilt the clamps relative to one another, between a position parallel to one another and a position tilted relative to one another,
   the tilting mechanism comprising a flexion bar configured to pass from a straight configuration, in the parallel position of the clamps to a curved configuration in the tilted position of the clamps,
   wherein the tilting mechanism comprises a jacket movable jointly with a first clamp from among the at least two clamps, the flexion bar being movable jointly with a second clamp from among the at least two clamps, the flexion bar being mounted translatable in the jacket, between a position inserted in the jacket and a position removed from the jacket, and the flexion bar includes a rod, the jacket defining a housing receiving the flexion bar, with a section larger than that of the rod, the jacket including a guide sleeve of the rod, with a cross-section complementary to that of the rod, the flexion bar comprising a head for guiding the movement of the flexion bar in the jacket, with a cross-section complementary to the receiving housing of the jacket, the clamps being received in the space with a triangular cross-section defined between the flexion bar, the first longitudinal jack, and the second longitudinal jack.

2. The device according to claim 1, wherein the flexion bar is biased elastically toward its straight configuration.

3. The device according to claim 1, wherein the curve radius of the flexion bar in the curved configuration is greater than 50 m.

4. The device according to claim 1, wherein the inspection support is movable jointly with the first clamp and with the jacket.

5. The device according to claim 1, wherein each longitudinal jack comprises a cylinder articulated on the first clamp, and a rod being articulated on the second clamp.

6. A fluid exploitation installation in a body of water, including:
   a production line deployed in the body of water, the production line having at least one curved region;
   a device according to claim 1, attached to the production line by the clamps of the attaching and moving assembly,
   the device being movable on the production line in the curved region, by passage of the flexion bar from its straight configuration to its curved configuration.

7. The installation according to claim 6, wherein the production line is a flexible fluid transport pipe, a rigid fluid transport pipe, an umbilical or a cable.

8. A method for inspecting a production line in a body of water, the production line having a curved region, the method comprising:
   attaching a device according to claim 1, onto the production line by the attaching and moving assembly;
   movement of the device along the production line by movement of the clamps of the attaching and moving assembly,
   inspecting the production line using the or each sensor;
   the movement of the device comprising the passage of the curved region by rotation of the clamps relative to one another between their parallel position and their tilted position, the rotation of the clamps comprising the deformation of the flexion bar from the straight configuration to the curved configuration.

9. The method according to claim 8, wherein the movement of the device comprises:
   attaching a second clamp relative to the production line;
   releasing a first clamp onto the production line, the first clamp being mobile jointly with the inspection support;
   moving the second clamp away from the first clamp to raise the first clamp and the inspection support jointly relative to the production line;
   attaching the first clamp to the production line;
   releasing the second clamp relative to the production line;
   moving the second clamp toward the first clamp, the first clamp and the inspection support remaining immobile relative to the production line.

10. The method according to claim 8, wherein inspecting the production line comprises the radial movement of the sensor on the inspection support between a retracted idle position and a position deployed applied on the production line.

11. The device according to claim 1, wherein the head and the guide sleeve are in plastic.

12. The device according to claim 1, wherein the first longitudinal jack and the second longitudinal jack are in a plane containing the production line.

13. The device according to claim 12, wherein the production line has an axis and the plane include the axis of the production line.

14. A movable device to inspect a production line intended to be partially submerged in a body of water, including:
   an inspection support bearing at least one sensor configured to be positioned facing the production line;
   an attaching and moving assembly configured to attach to and to move on the production line, the attaching and moving assembly being connected to the inspection support,
   the attaching and moving assembly including at least two clamps configured to be selectively actuated to grip onto the production line, each clamp delimiting a central passage having a longitudinal axis, the central passage being configured to receive the production line,
   the clamps being longitudinally movable relative to one another along the production line, the attaching and moving assembly comprising an active mechanism configured to move the clamps longitudinally relative to one another,
   the attaching and moving assembly including a tilting mechanism configured to tilt the clamps relative to one another, between a position parallel to one another and a position tilted relative to one another,
   the tilting mechanism comprising a flexion bar configured to pass from a straight configuration, in the parallel position of the clamps to a curved configuration in the tilted position of the clamps,
   wherein the active mechanism includes a first longitudinal jack mounted on the first side of the clamps, and a second longitudinal jack, mounted on a second side of the clamps, the clamps being received in the space with a triangular cross-section defined between the flexion bar, the first longitudinal jack, and the second longitudinal jack, and the flexion bar includes a rod, the jacket defining a housing receiving the flexion bar, with a section larger than that of the rod, the jacket including a guide sleeve of the rod, with a cross-section complementary to that of the rod, and wherein the flexion bar comprises a head for guiding the movement of the flexion bar in the jacket, with a cross-section complementary to the receiving housing of the jacket.

* * * * *